United States Patent
Chae et al.

(10) Patent No.: US 9,882,697 B2
(45) Date of Patent: Jan. 30, 2018

(54) METHOD AND APPARATUS FOR TRANSMITTING RECEIPT CONFIRMATION REPLY IN WIRELESS COMMUNICATION SYSTEM

(71) Applicant: LG ELECTRONICS INC., Seoul (KR)

(72) Inventors: Hyukjin Chae, Seoul (KR); Hanbyul Seo, Seoul (KR); Seungmin Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/759,355

(22) PCT Filed: Jan. 9, 2014

(86) PCT No.: PCT/KR2014/000258
§ 371 (c)(1),
(2) Date: Jul. 6, 2015

(87) PCT Pub. No.: WO2014/109571
PCT Pub. Date: Jul. 17, 2014

(65) Prior Publication Data
US 2015/0358137 A1    Dec. 10, 2015

Related U.S. Application Data

(60) Provisional application No. 61/750,801, filed on Jan. 9, 2013, provisional application No. 61/818,922, filed on (Continued)

(51) Int. Cl.
*H04L 5/00* (2006.01)
*H04L 1/18* (2006.01)
*H04W 74/00* (2009.01)

(52) U.S. Cl.
CPC .......... *H04L 5/0055* (2013.01); *H04L 1/1854* (2013.01); *H04W 74/004* (2013.01); *H04W 74/006* (2013.01)

(58) Field of Classification Search
CPC ... H04L 1/1864; H04L 1/1896; H04L 5/0055; H04W 74/004; H04W 74/006
See application file for complete search history.

(56) References Cited

U.S. PATENT DOCUMENTS

2011/0243039 A1* 10/2011 Papasakellariou .... H04L 1/1861
                                                                    370/280
2013/0039231 A1*  2/2013 Wang ..................... H04W 72/10
                                                                    370/280
(Continued)

FOREIGN PATENT DOCUMENTS

CN        101689984 A      3/2010
CN        102017506 A      4/2011
(Continued)

OTHER PUBLICATIONS

Alcatel-Lucent Shanghai Bell et al., "Discussion on timing issues with dynamic TDD UL-DL configuration," 3GPP TSG RAN WG1 Meeting #69, May 21-25, 2012, pp. 1-8, R1-122510.
(Continued)

*Primary Examiner* — Scott M Sciacca
(74) *Attorney, Agent, or Firm* — Birch, Stewart, Kolasch & Birch, LLP

(57) ABSTRACT

One embodiment of the present invention relates to a method for user equipment transmitting an uplink receipt confirmation reply in a wireless communication system, comprising the steps of: receiving a downlink signal from subframe n; and transmitting a receipt confirmation reply with respect to the downlink signal from the $k^{th}$ subframe from the subframe from which the downlink signal is received, wherein resource for the receipt confirmation reply
(Continued)

(a)

(b)

from the $k^{th}$ subframe is allocated with priority for subframes in a first group common to downlink subframes required to transmit the receipt confirmation reply from the $k^{th}$ subframe according to a first timeline, and downlink subframes required to transmit the receipt confirmation reply from the $k^{th}$ subframe according to a second timeline.

9 Claims, 14 Drawing Sheets

Related U.S. Application Data on May 3, 2013, provisional application No. 61/823,930, filed on May 16, 2013, provisional application No. 61/834,886, filed on Jun. 14, 2013.

(56) References Cited

U.S. PATENT DOCUMENTS

| | | | | |
|---|---|---|---|---|
| 2013/0136108 | A1* | 5/2013 | Cheng | H04L 1/1861 370/336 |
| 2013/0301433 | A1* | 11/2013 | Yin | H04W 16/02 370/252 |
| 2015/0195822 | A1* | 7/2015 | Han | H04W 52/0258 370/329 |

FOREIGN PATENT DOCUMENTS

| | | |
|---|---|---|
| WO | WO 2012/106840 A1 | 8/2012 |
| WO | WO 2012/113131 A1 | 8/2012 |

OTHER PUBLICATIONS

Catt, "Methods to support different UL/DL reconfiguration time scales for FS_LTE_TDD_eIMTA," 3GPP TSG RAN WG1 Meeting #69, May 21-25, 2012, pp. 1-3, R1-122062.

Huawei et al., "Methods to support different time scales for TDD UL-DL reconfiguration," 3GPP TSG RAN WG1 Meeting #69, May 21-25, 2012, 5 pages, R1-122909.

LG Electronics, "TDD DL-UL Reconfiguration Methods for eIMTA," 3GPP TSG RAN WG1 Meeting #69, May 21-25, 2012, pp. 1-5, R1-122318.

Renesas Mobile Europe Ltd., "Discussion on Enhancements for Dynamic TDD UL-DL Configuration," 3GPP TSG-RAN WG1 Meeting #69, May 21-25, 2012, 5 pages, R1-122363.

Ericsson et al., "Different TDD configurations in inter-band CA," 3GPP TSG-RAN WG2 #77bis, Jeju, South Korea, R2-121640, Mar. 26-30, 2012, pp. 1-4.

* cited by examiner

FIG. 9
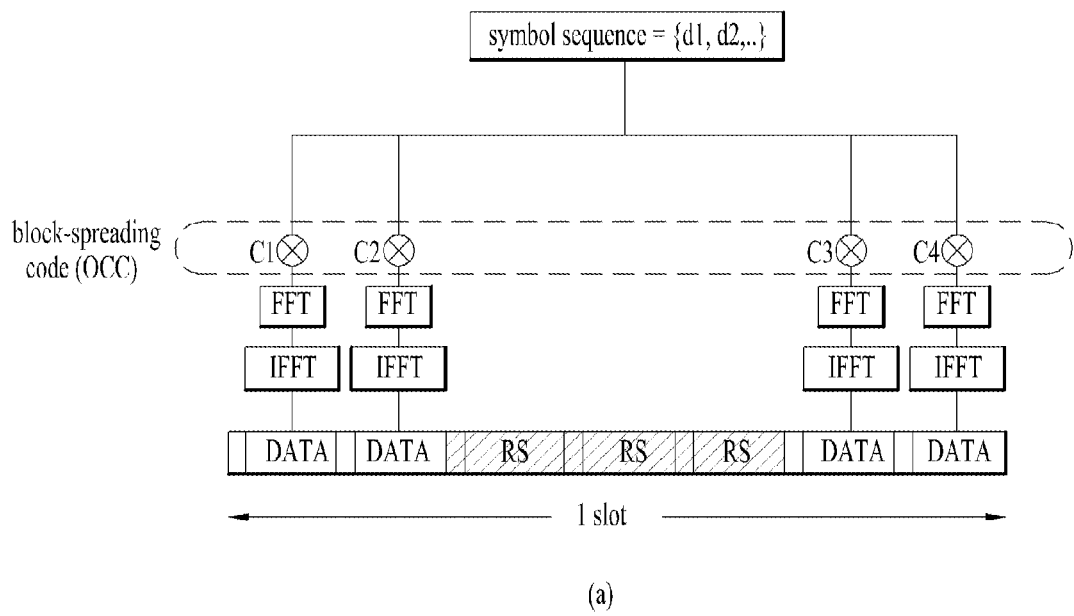
(a)
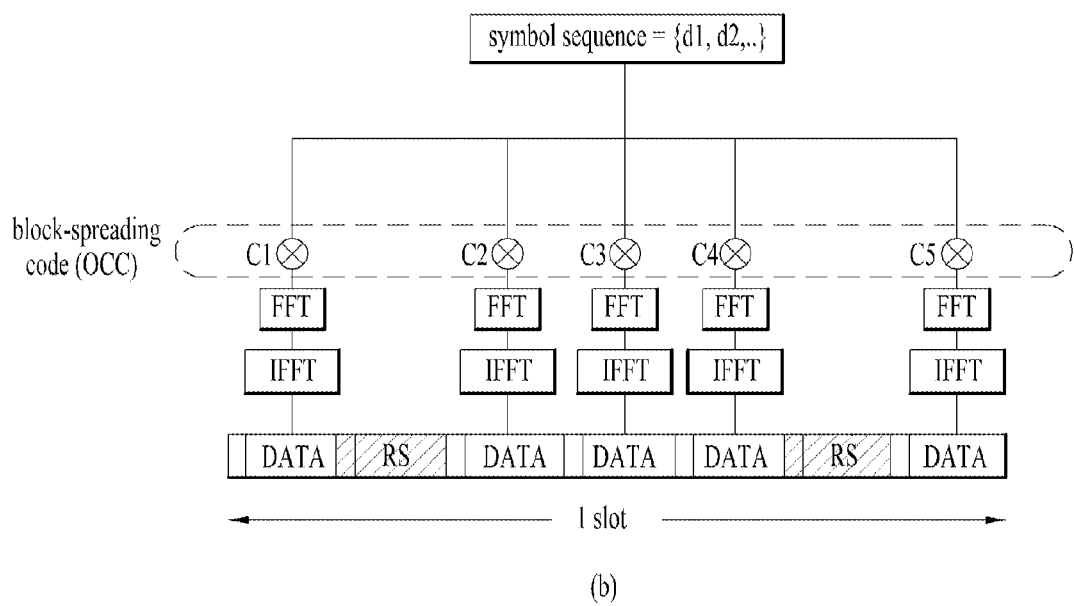
(b)

FIG. 13

| $N_{ECCE,0,j}$ | $N_{ECCE,1,j}$ | $N_{ECCE,2,j}$ | ECCE.3.j | $N_{ECCE,4,j}$ | ECCE.5.j | $N_{ECCE,6,j}$ | ECCE.7.j | $N_{ECCE,8,j}$ |
|---|---|---|---|---|---|---|---|---|
| m=0 | m=1 | m=2 | m=3 | m=4 | m=5 | m=6 | m=7 | m=8 |

METHOD AND APPARATUS FOR TRANSMITTING RECEIPT CONFIRMATION REPLY IN WIRELESS COMMUNICATION SYSTEM

CROSS REFERENCE TO RELATED APPLICATIONS

This application is the National Phase of PCT/KR2014/000258 filed on Jan. 9, 2014, which claims priority under 35 U.S.C. 119(e) to U.S. Provisional Application Nos. 61/750,801 filed on Jan. 9, 2013; 61/818,922 filed on May 3, 2013; 61/823,930 filed on May 16, 2013; and 61/834,886 filed on Jun. 14, 2013, all of which are hereby expressly incorporated by reference into the present application.

TECHNICAL FIELD

The present invention relates to a wireless communication system, and more particularly, to a method and apparatus for transmitting a reception response, when the usage of an uplink subframe is changed to a downlink subframe.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a Multi-Carrier Frequency Division Multiple Access (MC-FDMA) system.

DISCLOSURE

TECHNICAL PROBLEM

An object of the present invention devised to solve the conventional problem is to provide a method for transmitting a reception response, when the usage of an uplink subframe is changed to a downlink subframe in Time Division Duplex (TDD).

It will be appreciated by persons skilled in the art that the objects that could be achieved with the present invention are not limited to what has been particularly described hereinabove and the above and other objects that the present invention could achieve will be more clearly understood from the following detailed description.

TECHNICAL SOLUTION

In an aspect of the present invention, a method for transmitting an uplink reception response in a wireless communication system, performed by a User Equipment (UE) includes receiving a downlink signal in subframe n, and transmitting a reception response for the downlink signal in a $k^{th}$ subframe from the subframe carrying the downlink signal. Resources for the reception response in the $k^{th}$ subframe are allocated with priority to a subframe of a first group, common between downlink subframes for which reception responses are to be transmitted in the $k^{th}$ subframe according to a first timeline and downlink subframes for which reception responses are to be transmitted in the $k^{th}$ subframe according to a second timeline.

In another aspect of the present invention, a UE for transmitting an uplink reception response in a wireless communication system includes a reception module, and a processor. The processor is configured to receive a downlink signal in subframe n and transmit a reception response for the downlink signal in a $k^{th}$ subframe from the subframe carrying the downlink signal. Resources for the reception response in the $k^{th}$ subframe are allocated with priority to a subframe of a first group, common between downlink subframes for which reception responses are to be transmitted in the $k^{th}$ subframe according to a first timeline and downlink subframes for which reception responses are to be transmitted in the $k^{th}$ subframe according to a second timeline.

The above aspects of the present invention may include the followings.

The first timeline may be indicated to the UE by system information, and the second timeline may be applied when an uplink subframe is used as a downlink subframe.

At least a part of remaining resources except resources allocated to the first group among the resources for the reception response may be allocated to a subframe of a second group, except for the common subframe among the subframes for which the reception responses are to be transmitted in the subframe according to the second timeline.

The resources allocated to the second group may be contiguous to the resources allocated to the first group.

The resources allocated to the second group may be apart from the resources allocated to the first group by a predetermined offset.

The resources allocated to the second group may always be included in resources for Physical Uplink Control Channel (PUCCH) format 3.

If the first timeline is followed, the resources allocated to the second group may be allocated with priority to one of a downlink subframe and a special subframe from among subframes of the second group.

If the first timeline is followed, resources for reception responses allocated to subframes corresponding to uplink subframes among the subframes of the second group may be interleaved.

The downlink signal may be indicated by a Physical Downlink Control Channel (PDCCH).

Resources for a reception response to be transmitted repeatedly may be included only in an uplink subframe in an available timeline having a smaller number of uplink subframes between the first timeline and the second timeline.

If the UE fails to detect a reconfiguration message for the second timeline, the UE may monitor only a downlink subframe in an available timeline having a smaller number of uplink subframes between the first timeline and the second timeline.

The UE may not transmit a reception response for a radio frame in which the UE fails to detect the reconfiguration message.

The UE may transmit a reception response only for the monitored subframe.

ADVANTAGEOUS EFFECTS

According to the present invention, collision between resources for reception responses, which may occur when the usage of an uplink subframe is changed to a downlink subframe, can be resolved.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings:

FIG. 9 illustrates a structure of a PUCCH to which block spreading is applied;

FIGS. 11, 12, and 13 are views referred to for describing reception responses in Time Division Duplex (TDD);

BEST MODE FOR CARRYING OUT THE INVENTION

Figure 1:
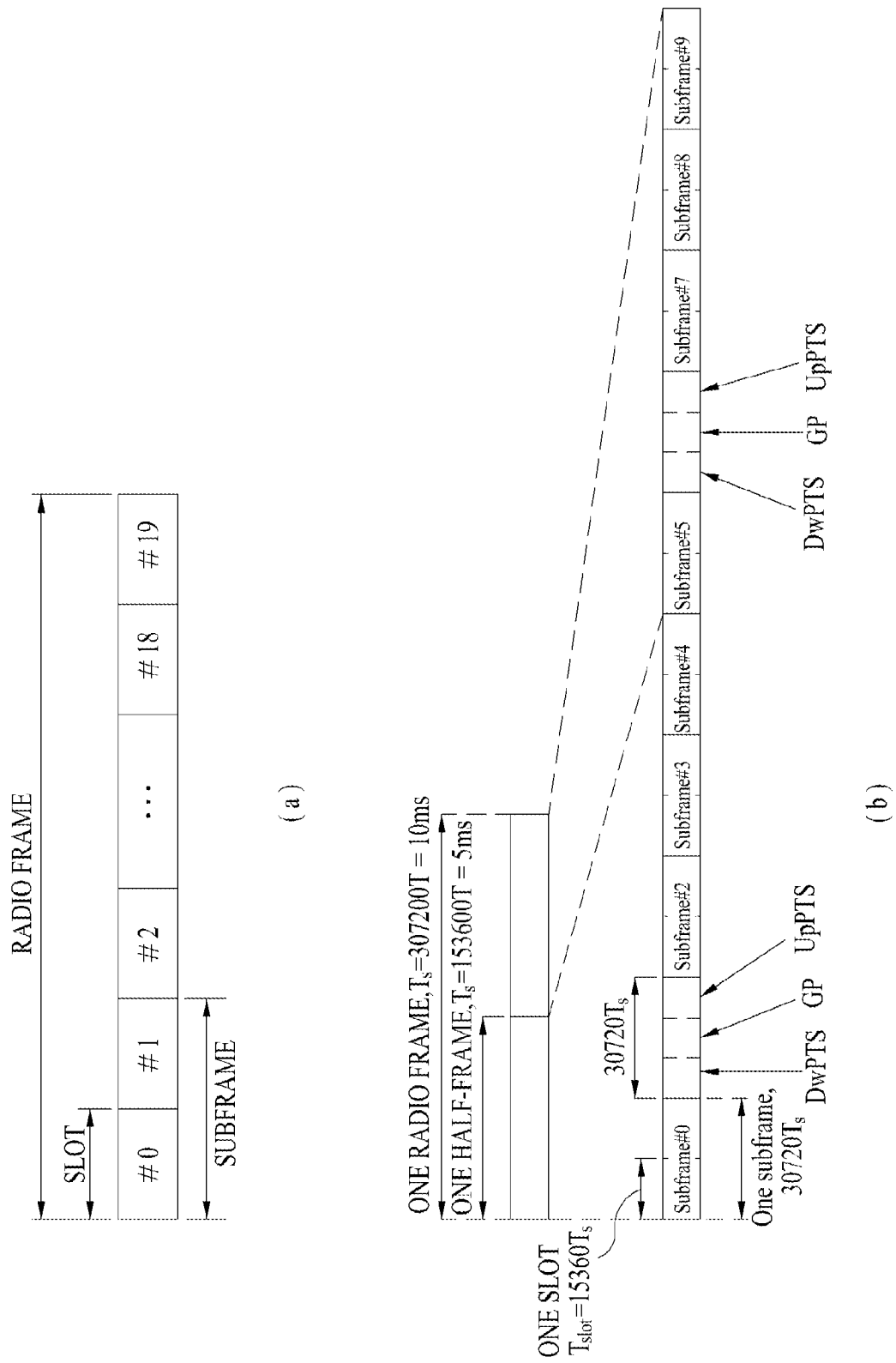
FIG. 1 illustrates a radio frame structure.

The embodiments described below are constructed by combining elements and features of the present invention in a predetermined form. The elements or features may be considered selective unless explicitly mentioned otherwise. Each of the elements or features can be implemented without being combined with other elements. In addition, some elements and/or features may be combined to configure an embodiment of the present invention. The sequence of the operations discussed in the embodiments of the present invention may be changed. Some elements or features of one embodiment may also be included in another embodiment, or may be replaced by corresponding elements or features of another embodiment.

Embodiments of the present invention will be described, focusing on a data communication relationship between a base station and a terminal. The base station serves as a terminal node of a network over which the base station directly communicates with the terminal. Specific operations illustrated as being conducted by the base station in this specification may also be conducted by an upper node of the base station, as necessary.

In other words, it will be obvious that various operations allowing for communication with the terminal in a network composed of several network nodes including the base station can be conducted by the base station or network nodes other than the base station. The term "base station (BS)" may be replaced with terms such as "fixed station," "Node-B," "eNode-B (eNB)," and "access point". The term "relay" may be replaced with such terms as "relay node (RN)" and "relay station (RS)". The term "terminal" may also be replaced with such terms as "user equipment (UE)," "a mobile station (MS)," "mobile subscriber station (MSS)" and "subscriber station (SS)".

It should be noted that specific terms disclosed in the present invention are proposed for convenience of description and better understanding of the present invention, and these specific terms may be changed to other formats within the technical scope or spirit of the present invention.

In some cases, known structures and devices may be omitted or block diagrams illustrating only key functions of the structures and devices may be provided, so as not to obscure the concept of the present invention. The same reference numbers will be used throughout this specification to refer to the same or like parts.

Exemplary embodiments of the present invention are supported by standard documents disclosed for at least one of wireless access systems including an institute of electrical and electronics engineers (IEEE) 802 system, a 3rd generation partnership project (3GPP) system, a 3GPP long term evolution (LTE) system, an LTE-advanced (LTE-A) system, and a 3GPP2 system. In particular, steps or parts, which are not described in the embodiments of the present invention to prevent obscuring the technical spirit of the present invention, may be supported by the above documents. All terms used herein may be supported by the above-mentioned documents.

The embodiments of the present invention described below can be applied to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA may be embodied through wireless technologies such as universal terrestrial radio access (UTRA) or CDMA2000. TDMA may be embodied through wireless technologies such as global system for mobile communication (GSM)/general packet radio service (GPRS)/enhanced data rates for GSM evolution (EDGE). OFDMA may be embodied through wireless technologies such as IEEE 802.11 (Wi-Fi), IEEE 802.16 (WiMAX), IEEE 802-20, and evolved UTRA (E-UTRA). UTRA is a part of universal mobile telecommunications system (UMTS). 3rd generation partnership project (3GPP) long term evolution (LTE) is a part of evolved UMTS (E-UMTS), which uses E-UTRA. 3GPP LTE employs OFDMA for downlink and employs SC-FDMA for uplink. LTE-Advanced (LTE-A) is an evolved version of 3GPP LTE. WiMAX can be explained by IEEE 802.16e (wirelessMAN-OFDMA reference system) and advanced IEEE 802.16m (wirelessMAN-OFDMA advanced system). For clarity, the following description focuses on 3GPP LTE and 3GPP LTE-A systems. However, the spirit of the present invention is not limited thereto.

LTE/LTE-A Resource Structure/Channel

Hereinafter, a radio frame structure will be described with reference to FIG. 1.

In a cellular OFDM wireless packet communication system, an uplink (UL)/downlink (DL) data packet is transmitted on a subframe basis, and one subframe is defined as a predetermined time interval including a plurality of OFDM symbols. 3GPP LTE standard supports a type-1 radio frame structure applicable to frequency division duplex (FDD) and a type-2 radio frame structure applicable to time division duplex (TDD).

FIG. 1(a) illustrates the type-1 radio frame structure. A downlink radio frame is divided into ten subframes. Each subframe includes two slots in the time domain. The time taken to transmit one subframe is defined as a transmission time interval (TTI). For example, a subframe may have a duration of 1 ms and one slot may have a duration of 0.5 ms. A slot may include a plurality of OFDM symbols in the time domain and includes a plurality of resource blocks (RBs) in the frequency domain. Since 3GPP LTE adopts OFDMA for downlink, an OFDM symbol represents one symbol period. An OFDM symbol may be referred to as an SC-FDMA symbol or a symbol period. A resource block (RB), which is a resource allocation unit, may include a plurality of consecutive subcarriers in a slot.

The number of OFDM symbols included in one slot depends on the configuration of a cyclic prefix (CP). CPs are divided into an extended CP and a normal CP. For a normal CP configuring each OFDM symbol, a slot may include 7 OFDM symbols. For an extended CP configuring each OFDM symbol, the duration of each OFDM symbol extends and thus the number of OFDM symbols included in a slot is smaller than in the case of the normal CP. For the extended CP, a slot may include, for example, 6 OFDM symbols. When a channel status is unstable as in the case of high speed movement of a UE, the extended CP may be used to reduce inter-symbol interference.

When the normal CP is used, each slot includes 7 OFDM symbols, and thus each subframe includes 14 OFDM symbols. In this case, the first two or three OFDM symbols of each subframe may be allocated to a physical downlink control channel (PDCCH) and the other three OFDM symbols may be allocated to a physical downlink shared channel (PDSCH).

FIG. 1(b) illustrates the type-2 radio frame structure. The type-2 radio frame includes two half frames, each of which has 5 subframes, a downlink pilot time slot (DwPTS), a guard period (GP), and an uplink pilot time slot (UpPTS). Each subframe includes two slots. The DwPTS is used for initial cell search, synchronization, or channel estimation in a UE, whereas the UpPTS is used for channel estimation in an eNB and UL transmission synchronization in a UE. The GP is provided to eliminate interference taking place in UL due to multipath delay of a DL signal between DL and UL. Regardless of the type of a radio frame, a subframe of the radio frame includes two slots.

Herein, the illustrated radio frame structures are merely examples, and various modifications may be made to the number of subframes included in a radio frame, the number of slots included in a subframe, or the number of symbols included in a slot.

Figure 2:
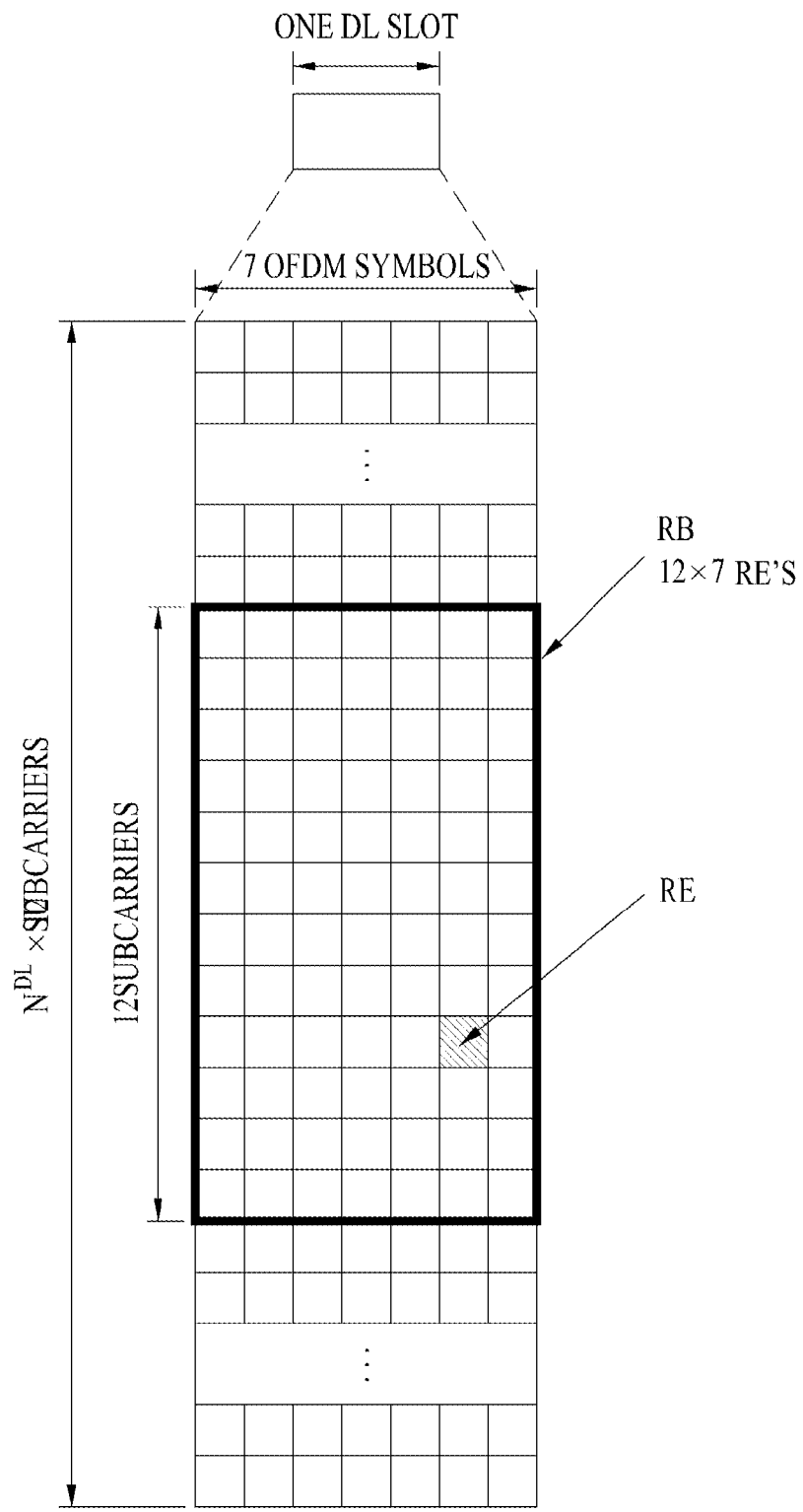
FIG. 2 illustrates a resource grid for the duration of a downlink slot.

FIG. 2 is a diagram illustrating a resource grid for one DL slot. A DL slot includes 7 OFDM symbols in the time domain and an RB includes 12 subcarriers in the frequency domain. However, embodiments of the present invention are not limited thereto. For a normal CP, a slot may include 7 OFDM symbols. For an extended CP, a slot may include 6 OFDM symbols. Each element in the resource grid is referred to as a resource element (RE). An RB includes 12×7 REs. The number $N^{DL}$ of RBs included in a downlink slot depends on a DL transmission bandwidth. A UL slot may have the same structure as a DL slot.

Figure 3:
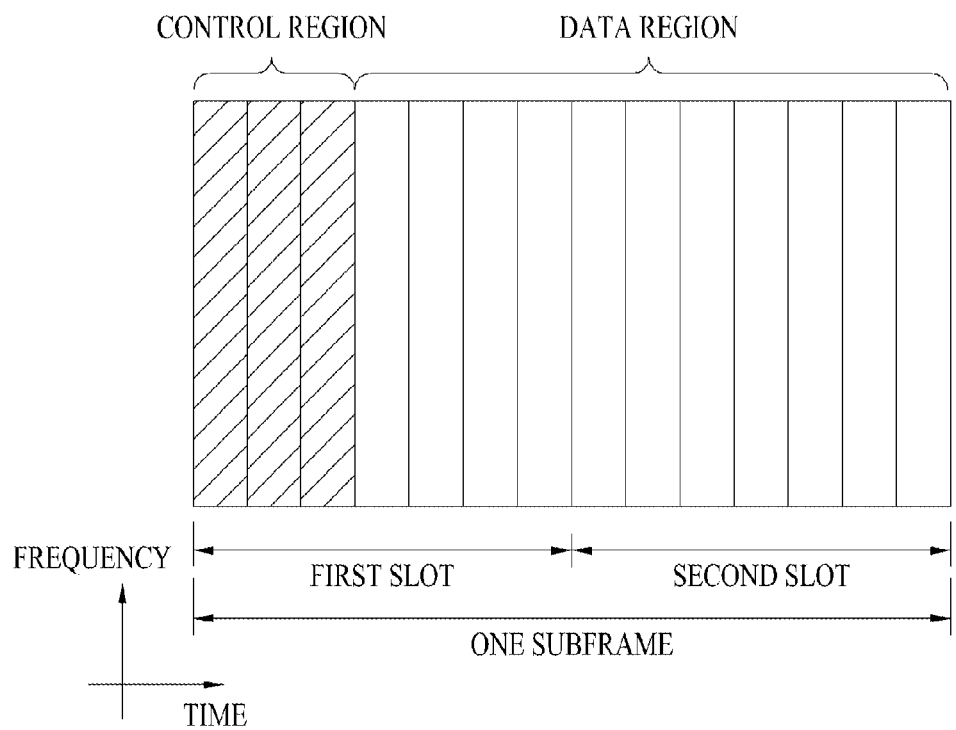
FIG. 3 illustrates a downlink subframe structure.

FIG. 3 illustrates a DL subframe structure. Up to the first three OFDM symbols of the first slot in a DL subframe used as a control region to which control channels are allocated and the other OFDM symbols of the DL subframe are used as a data region to which a PDSCH is allocated. DL control channels used in 3GPP LTE include, for example, a physical control format indicator channel (PCFICH), a physical downlink control channel (PDCCH), and a physical hybrid automatic repeat request (HARQ) indicator channel (PHICH). The PCFICH is transmitted at the first OFDM symbol of a subframe, carrying information about the number of OFDM symbols used for transmission of control channels in the subframe. The PHICH carries a HARQ ACK/NACK signal in response to uplink transmission. Control information carried on the PDCCH is called downlink control information (DCI). The DCI includes UL or DL scheduling information or UL transmission power control commands for UE groups. The PDCCH delivers information about resource allocation and a transport format for a DL shared channel (DL-SCH), resource allocation information about an UL shared channel (UL-SCH), paging information of a paging channel (PCH), system information on the DL-SCH, information about resource allocation for a higher-layer control message such as a random access response transmitted on the PDSCH, a set of transmission power control commands for individual UEs of a UE group, transmission power control information, and voice over interne protocol (VoIP) activation information. A plurality of PDCCHs may be transmitted in the control region. A UE may monitor a plurality of PDCCHs. A PDCCH is formed by aggregating one or more consecutive control channel elements (CCEs). A CCE is a logical allocation unit used to provide a PDCCH at a coding rate based on the state of a radio channel. A CCE corresponds to a plurality of RE groups. The format of a PDCCH and the number of available bits for the PDCCH are determined depending on the correlation between the number of CCEs and a coding rate provided by the CCEs. An eNB determines the PDCCH format according to DCI transmitted to a UE and adds a cyclic redundancy check (CRC) to the control information. The CRC is masked by an identifier (ID) known as a radio network temporary identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a paging indicator identifier (P-RNTI). If the PDCCH delivers system information, particularly, a system information block (SIB), the CRC thereof may be masked by a system information ID and a system information RNTI (SI-RNTI). To indicate that the PDCCH delivers a random access response in response to a random access preamble transmitted by a UE, the CRC thereof may be masked by a random access-RNTI (RA-RNTI).

Figure 4:
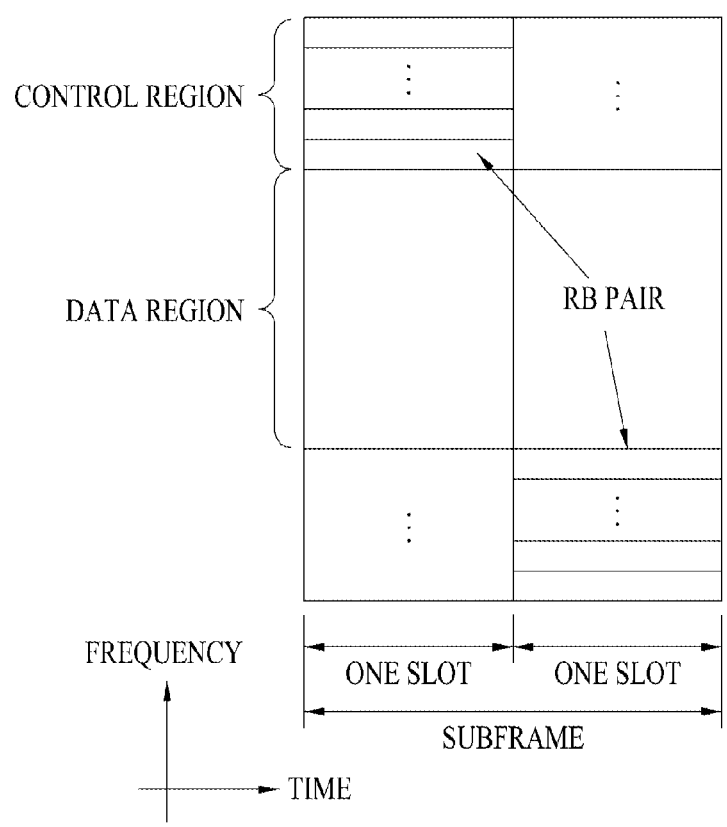
FIG. 4 illustrates an uplink subframe structure.

FIG. 4 illustrates a UL subframe structure. A UL subframe may be divided into a control region and a data region in the frequency domain. A physical uplink control channel (PUCCH) carrying uplink control information is allocated to the control region and a physical uplink shared channel (PUSCH) carrying user data is allocated to the data region. To maintain single carrier property, a UE does not simultaneously transmit a PUSCH and a PUCCH. A PUCCH for a UE is allocated to an RB pair in a subframe. The RBs of the RB pair occupy different subcarriers in two slots. This is often called frequency hopping of the RB pair allocated to the PUCCH over a slot boundary.

PUCCH

UL control information (UCI) transmitted over a PUCCH may include a scheduling request (SR), HARQ ACK/NACK information, and DL channel measurement information.

The HARQ ACK/NACK information may be generated depending on whether decoding of a DL data packet on a PDSCH is successful. In a conventional wireless communication system, 1 bit is transmitted as ACK/NACK information for DL single codeword transmission and 2 bits are transmitted as ACK/NACK information DL 2-codeword transmission.

The channel measurement information may refer to feedback information associated with a multiple input multiple output (MIMO) scheme and include a channel quality indicator (CQI), a precoding matrix index (PMI), and a rank indicator (RI). The channel measurement information may be collectively referred to as CQI. 20 bits may be used per subframe to transmit CQI.

The PUCCH may be demodulated using a binary phase shift keying (BPSK) scheme and a quadrature phase shift keying (QPSK) scheme. Control information of a plurality of UEs may be transmitted over the PUCCH. When code division multiplexing (CDM) is performed to distinguish between signals of UEs, constant amplitude zero autocorrelation (CAZAC) with a length of 12 is mainly used. The CAZAC sequence has characteristics of maintaining a constant amplitude in the time domain and frequency domain and thus is suitable for reduction in peak-to-average power ratio (PAPR) or cubic metric (CM) of a UE to increase coverage. In addition, ACK/NACK information in response to DL data transmitted over a PUCCH is covered using an orthogonal sequence or orthogonal cover (OC).

In addition, control information transmitted on a PUCCH may be distinguished using cyclically shifted sequences having different cyclic shift (CS) values. A cyclically shifted sequence may be generated by cyclically shifting a base sequence by a specific CS amount. The specific CS amount is indicated by a CS index. The number of available CSs may change depending on channel delay spread. Various types of sequences may be used as the base sequence and the aforementioned CAZAC sequence is an example of the base sequence.

In addition, the amount of control information that a UE can transmit in a subframe may be determined depending on the number of SC-FDMA symbols (i.e., SC-FDMA symbols except for an SC-FDMA symbol used to transmit a reference signal (RS) for coherent detection of PUCCH) that can be used to transmit the control information. In 3GPP LTE, a PUCCH is defined in seven different formats according to transmitted control information, a modulation scheme and the amount of control information. Attributes of transmitted uplink control information (UCI) for each PUCCH format may be summarized as shown in [Table 1].

TABLE 1

| PUCCH format | Modulation Scheme | Number of bits per subframe | Usage | Etc. |
| --- | --- | --- | --- | --- |
| 1 | N/A | N/A | SR (Scheduling Request) | |
| 1a | BPSK | 1 | ACK/NACK | One codeword |
| 1b | QPSK | 2 | ACK/NACK | Two codeword |
| 2 | QPSK | 20 | CQI | Joint Coding ACK/NACK (extended CP) |

TABLE 1-continued

| PUCCH format | Modulation Scheme | Number of bits per subframe | Usage | Etc. |
| --- | --- | --- | --- | --- |
| 2a | QPSK + BPSK | 21 | CQI + ACK/NACK | Normal CP only |
| 2b | QPSK + BPSK | 22 | CQI + ACK/NACK | Normal CP only |

PUCCH format 1 is used to transmit an SR only. When the SR is transmitted alone, an unmodulated waveform is applied, which will be described in detail below.

PUCCH format 1a or 1b is used for transmission of HARQ ACK/NACK. When only HARQ ACK/NACK is transmitted in a subframe, PUCCH format 1a or 1b may be used. Alternatively, HARQ ACK/NACK and SR may be transmitted in the same subframe using PUCCH format 1a or 1b.

PUCCH format 2 is used for transmission of CQI, whereas PUCCH format 2a or 2b is used for transmission of CQI and HARQ ACK/NACK. For the extended CP, PUCCH format 2 may be used for transmission of CQI and HARQ ACK/NACK.

Figure 5:
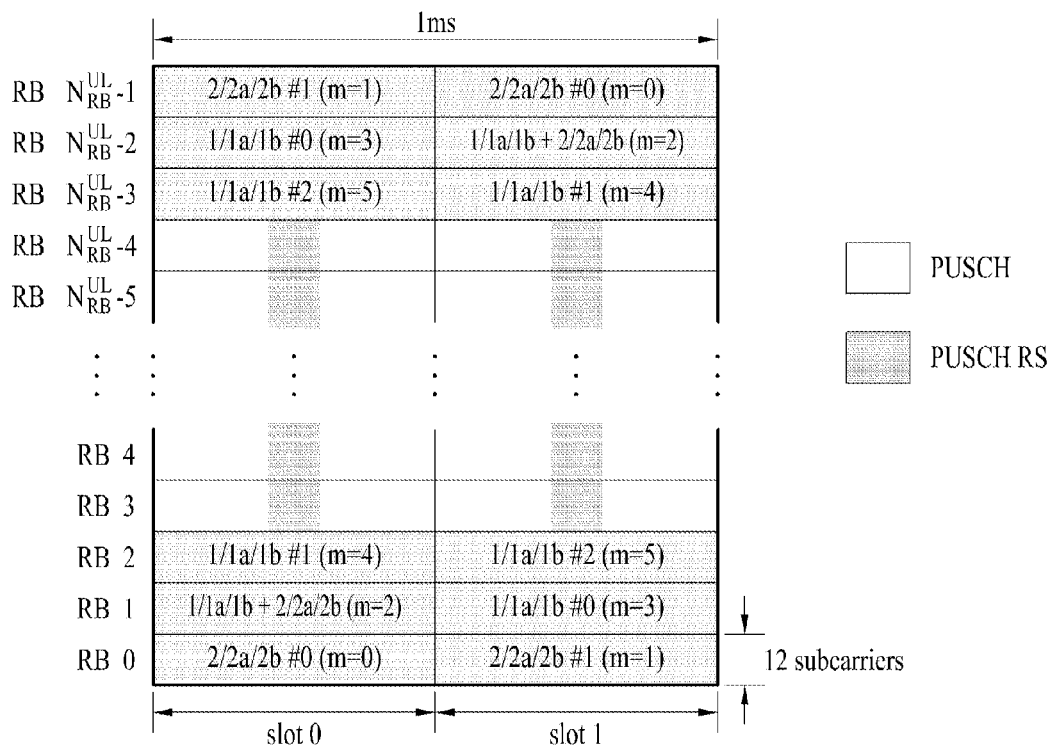
FIG. 5 illustrates mapping of Physical Uplink Control Channel (PUCCH) formats to uplink Physical Resource Blocks (PRBs)

FIG. 5 illustrates mapping of PUCCH formats to PUCCH regions in UL physical resource blocks. In FIG. 5, $n_{PUCCH}^{(2)}$ denotes the number of resource blocks on UL, and 0, 1, . . . , $n_{PUCCH}^{(2)}-1$ represents physical resource block numbers. Basically, a PUCCH is mapped to opposite edges of a UL frequency block. As illustrated in FIG. 5, PUCCH formats 2/2a/2b are mapped to PUCCH regions indicated by m=0 and 1, which may represent that PUCCH formats 2/2a/2b are mapped to resource blocks positioned at the band-edges. In addition, PUCCH formats 2/2a/2b and PUCCH formats 1/1a/1b may be mixed and mapped to a PUCCH region indicated by m=2. PUCCH formats 1/1a/1b may be mapped to PUCCH regions indicated by m=3, 4, and 5. The number ($n_{PUCCH}^{(1)}$) of available PUCCH RBs may be indicated to UEs in a cell by the PUCCH format 2/2a/2b, through broadcast signaling.

PUCCH Resources

A BS allocates a PUCCH resource for UCI transmission to a UE in an implicit or explicit manner through higher layer signaling.

For ACK/NACK, a plurality of PUCCH resource candidates may be set for the UE by a higher layer. Of the PUCCH resource candidates, a PUCCH resource to be used by the UE may be determined in an implicit manner. For example, the UE may receive a PDSCH from the BS and transmit ACK/NACK for a corresponding data unit through a PUCCH resource implicitly determined by a PDCCH resource that carries scheduling information about the PDSCH.

Figure 6:
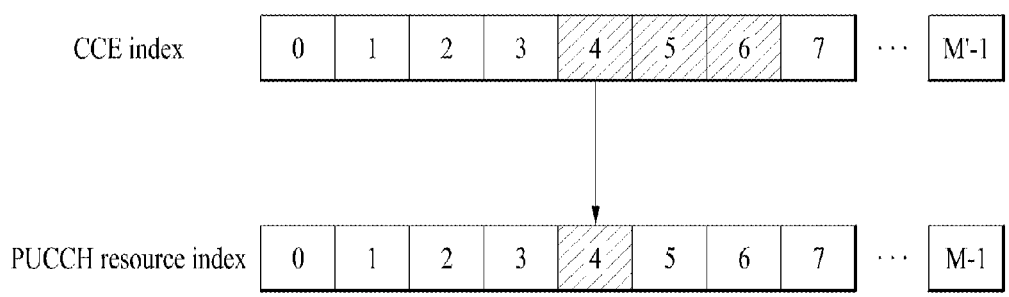
FIG. 6 illustrates an example of determining PUCCH resources for an Acknowledgement/Negative Acknowledgement (ACK/NACK)

FIG. 6 illustrates an example of determining PUCCH resources for ACK/NACK.

In LTE, a PUCCH resource for ACK/NACK information is not pre-allocated to UEs. Rather, PUCCH resources are used separately by a plurality of UEs within a cell at each time. Specifically, a PUCCH resource that a UE uses to transmit ACK/NACK is implicitly determined based on a PDCCH carrying scheduling information about a PDSCH that delivers the DL data. An entire area in which a PDCCH is transmitted in a DL subframe includes a plurality of control channel elements (CCEs) and a PDCCH transmitted to a UE includes one or more CCEs. A CCE includes a plurality of (e.g., 9) resource element groups (REGs). One REG includes four resource elements (REs) that neighbors each other with an RS excluded. The UE transmits ACK/NACK through an implicit PUCCH resource that is derived or calculated according to a function of a specific CCE index (e.g., the first or lowest CCE index) from among the CCE indexes included in a PDCCH received by the UE.

Referring to FIG. 6, each PUCCH resource index corresponds to a PUCCH resource for ACK/NACK. As illustrated in FIG. 6, suppose that scheduling information about the PDSCH is transmitted to the UE on a PDCCH including CCEs #4, #5 and #6. The UE transmits ACK/NACK to a BS on a PUCCH, for example, PUCCH #4 that is derived or calculated from the lowest CCE index 4 constituting the PDCCH. FIG. 6 illustrates a case in which up to M' CCEs are present in the DL and up to M PUCCHs are present in UL. M may be equal to M', but it is also possible to set M to be different from M' and to map CCEs to PUCCHs in an overlapping manner.

For example, a PUCCH resource index may be determined by the following equation.

$$n_{PUCCH}^{(1)} = n_{CCE} + N_{PUCCH}^{(1)} \quad \text{[Equation 1]}$$

Herein, $n_{PUCCH}^{(1)}$ denotes the index of a PUCCH resource for transmission of ACK/NACK, and $N_{PUCCH}^{(1)}$ denotes a signaling value received from a higher layer. $n_{CCE}$ may denote the lowest index of the CCE indexes used for transmission of a PDCCH.

PUCCH Channel Structure

PUCCH formats 1a/1b will be described first below.

In PUCCH formats 1a/1b, a symbol modulated using BPSK or QPSK is multiplied by a CAZAC sequence having a length of 12. For example, multiplying a modulation symbol d(0) by a CAZAC sequence r(n) (n=0, 1, 2, . . . , N−1) having a length of N gives a result of y(0), y(1), y(2), . . . , y(N−1). Symbols y(0), y(1), y(2), . . . , and y(N−1) may be called a block of symbols. After the modulation symbol is multiplied by the CAZAC sequence, block-wise-spreading using an orthogonal sequence is applied.

A Hadamard sequence with a length of 4 is employed for general ACK/NACK information, while a discrete Fourier transform (DFT) with a length of 3 is employed for shortened ACK/NACK information and a reference signal. For an extended CP, a Hadamard sequence with a length of 2 is employed for a reference signal.

Figure 7:
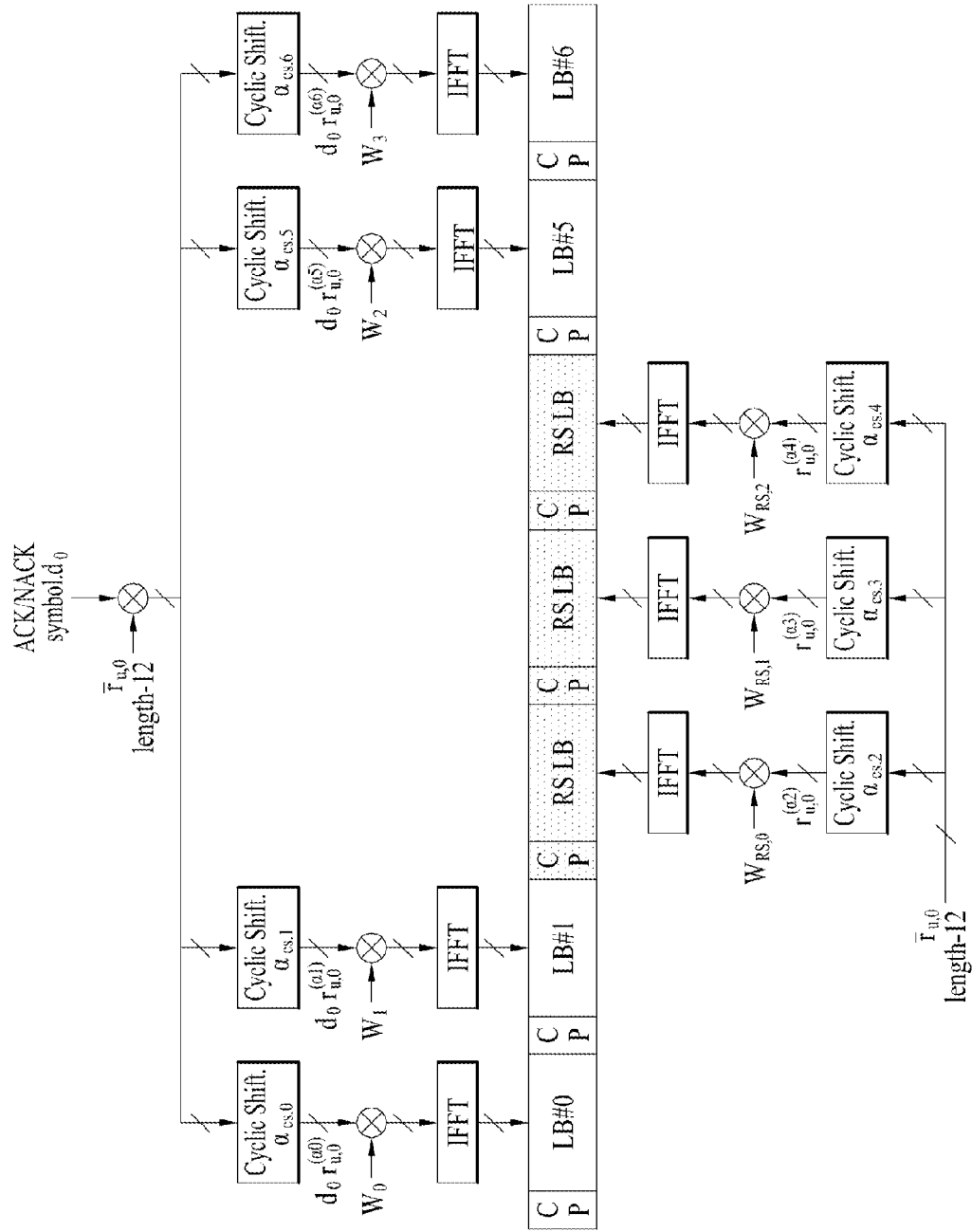
FIG. 7 illustrates a structure of an ACK/NACK channel in the case of normal Cyclic Prefix (CP)

FIG. 7 illustrates an ACK/NACK channel structure for a normal CP. FIG. 7 exemplarily shows the structure of a PUCCH channel for transmission of HARQ ACK/NACK without CQI. Three consecutive SC-FDMA symbols in the middle of seven SC-FDMA symbols carry RSs and the remaining four SC-FDMA symbols carry ACK/NACK signals. For the extended CP, two consecutive symbols in the middle of SC-FDMA symbols may carry RSs. The number and positions of symbols used for an RS may change depending on a control channel, and the number and positions of symbols used for a ACK/NACK signal associated with the RS may change depending on the number and positions of symbols used for the RS.

1-bit ACK/NACK information and 2-bit ACK/NACK information (which is unscrambled) may be represented in a HARQ ACK/NACK modulation symbol using BPSK and QPSK, respectively. ACK may be encoded as 1, and NACK may be encoded as 0.

When a control signal is transmitted within an allocated band, 2-dimensional spreading is applied to enhance multiplexing capacity. That is, frequency domain spreading and time domain spreading are simultaneously applied to increase the number of UEs or control channels that can be multiplexed. To spread an ACK/NACK signal in the frequency domain, a frequency domain sequence is used as a basic sequence. A Zadoff-Chu (ZC) sequence, one of CAZAC sequences, may be used as the frequency domain sequence. For example, different cyclic shifts (CSs) may be applied to a ZC sequence, which is the basic sequence, to multiplex different UEs or different control channels. The number of CS resources supported by SC-FDMA symbols for PUCCH RBs for HARQ ACK/NACK transmission is set by a cell-specific higher-layer signaling parameter ($\Delta_{shift}^{PUCCH}$), and $\Delta_{shift}^{PUCCH} \in \{1, 2, 3\}$ represents 12, 6, or 4 shifts.

A frequency-domain-spread ACK/NACK signal is spread in the time domain using an orthogonal spreading code. As the orthogonal spreading code, a Walsh-Hadamard sequence or a DFT sequence may be used. For example, the ACK/NACK signal may be spread using orthogonal sequences (w0, w1, w2, w3) with a length of 4 for four symbols. In addition, the RS may also be spread using an orthogonal sequence with a length of 3 or 2, which is referred to as orthogonal covering (OC).

A plurality of UEs may be multiplexed in a code division multiplexing (CDM) scheme using CS resources in the frequency domain and OC resources in the time domain as described above. That is, ACK/NACK information and RSs of a large number of UEs may be multiplexed on the same PUCCH RB.

In time domain spreading CDM, the number of supported spreading codes for the ACK/NACK information is restricted by the number of RS symbols. That is, the number of SC-FDMA symbols for RS transmission is smaller than the number of SC-FDMA symbols for ACK/NACK transmission, and therefore multiplexing capacity of an RS is lower than multiplexing capacity of the ACK/NACK information. For example, in the case of a normal CP, the ACK/NACK information may be transmitted in four symbols, but three orthogonal spreading codes are used rather than four orthogonal spreading codes for the ACK/NACK information. This is because the number of RS transmission symbols is limited to three and thus only three orthogonal spreading codes can be used for the RS.

Examples of an orthogonal sequence used in spreading ACK/NACK information are shown in [Table 2] and [Table 3]. [Table 2] shows a sequence for a symbol having a length of 4 and [Table 3] shows a sequence for a symbol having a length of 3. The sequence for the symbol having a length of 4 is used in PUCCH formats 1/1a/1b of a normal subframe configuration. Considering a case in which an SRS is transmitted on the last symbol of the second slot in a subframe configuration, the sequence for the symbol with the length of 4 may be applied to the first slot and shortened PUCCH formats 1/1a/1b of the sequence for the symbol with the length of 3 may be applied to the second slot.

TABLE 2

| Sequence index $n_{oc}^{(p)}(n_s)$ | Orthogonal sequences $[w(0) \ldots w(N_{SF}^{PUCCH} - 1)]$ |
| --- | --- |
| 0 | [+1 +1 +1 +1] |
| 1 | [+1 −1 +1 −1] |
| 2 | [+1 −1 −1 +1] |

TABLE 3

| Sequence index $n_{oc}^{(p)}(n_s)$ | Orthogonal sequences $[w(0) \ldots w(N_{SF}^{PUCCH} - 1)]$ |
| --- | --- |
| 0 | [1 1 1] |
| 1 | [1 $e^{j2\pi/3}$ $e^{j4\pi/3}$] |
| 2 | [1 $e^{j4\pi/3}$ $e^{j2\pi/3}$] |

When three symbols are used for RS transmission and four symbols are used for ACK/NACK information transmission in a slot of a subframe of the normal CP, if, for example, six CSs in the frequency domain and three OC resources in the time domain are allowed to be used, HARQ ACK/NACK signals from 18 different UEs may be multiplexed in a PUCCH RB. When two symbols are used for RS transmission and four symbols are used for ACK/NACK information transmission in a slot of a subframe of the extended CP, if, for example, six CSs in the frequency domain and two OC resources in the time domain are allowed to be used, HARQ ACK/NACK signals from 12 different UEs may be multiplexed in a PUCCH RB.

Hereinafter, PUCCH format 1 will be described. A scheduling request (SR) is transmitted by requesting scheduling of the UE or not requesting scheduling of the UE. An SR channel reuses an ACK/NACK channel structure in PUCCH formats 1a/1b and is configured in an on-off keying (OOK) manner based on the design of the ACK/NACK channel. An RS is not transmitted on an SR channel. Thus, a sequence with a length of 7 is used in the case of the normal CP, and a sequence with a length of 6 is used in the case of the extended CP. Different CSs or orthogonal covers may be allocated to an SR and ACK/NACK. That is, in implementing transmission of a positive SR, the UE transmits HARQ ACK/NACK through resources allocated for the SR. In implementing transmission of a negative SR, the UE transmits HARQ ACK/NACK through resources allocated for ACK/NACK.

Hereinafter, PUCCH formats 2/2a/2b will be described. PUCCH formats 2/2a/2b are control channels for transmission of channel measurement feedback (CQI, PMI and RI).

A report period of the channel measurement feedback (hereinafter, referred to as CQI information) and a frequency unit (or frequency resolution) subject to measurement may be controlled by a BS. Periodic and aperiodic CQI reports may be supported in the time domain. PUCCH format 2 may be used only for the periodic report and a PUSCH may be used for the aperiodic report. In the case of the aperiodic report, the BS may instruct the UE to transmit an individual CQI report on a resource scheduled for UL data transmission.

Figure 8:
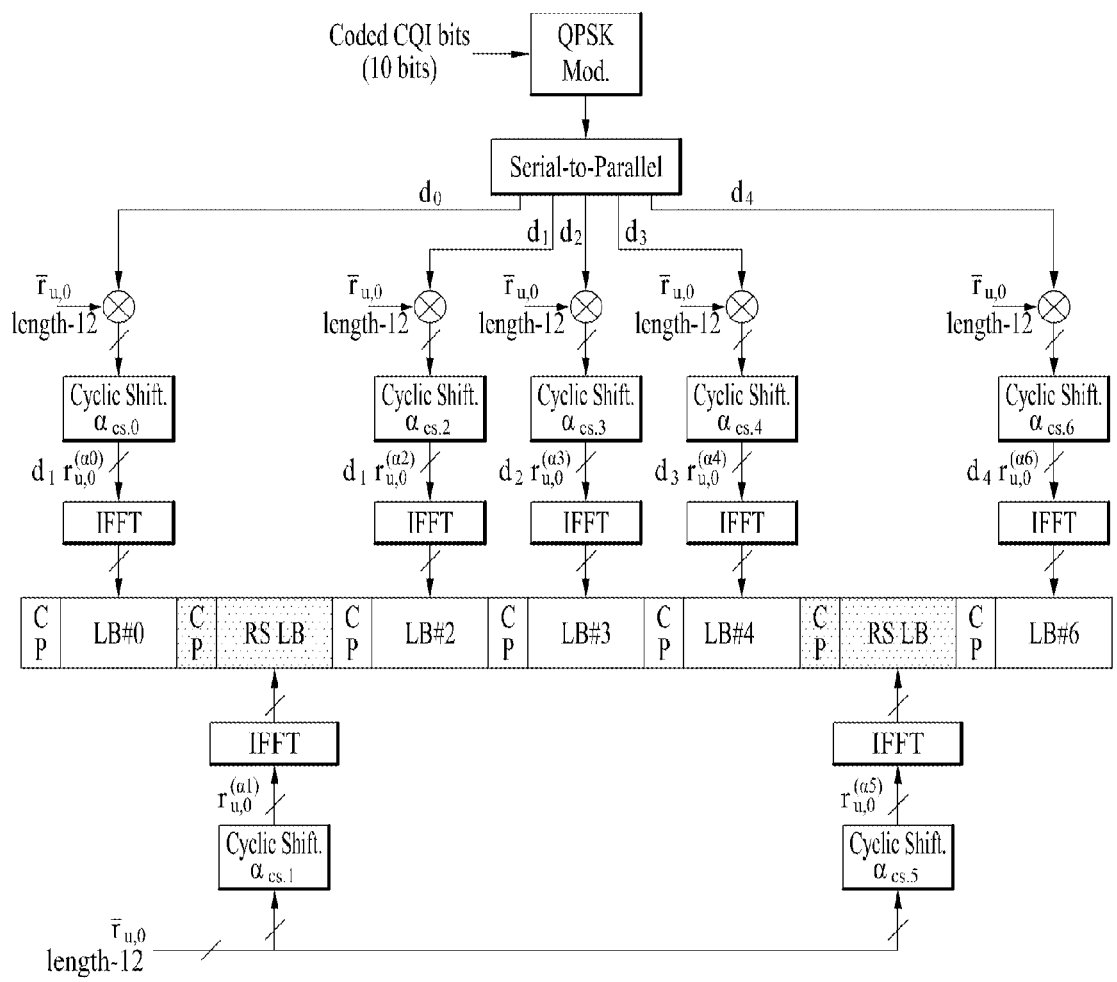
FIG. 8 illustrates a structure of a Channel Quality Indicator (CQI) channel in the case of normal CP.

FIG. 8 illustrates a CQI channel structure for a normal CP. SC-FDMA symbols #1 and #5 (second and sixth symbols) from among SC-FDMA symbols #0 to #6 of a slot may be used to transmit a demodulation reference signal (DMRS), and CQI information may be transmitted in the remaining SC-FDMA symbols. In the case of an extended CP, one SC-FDMA symbol (SC-FDMA symbol #3) is used to transmit the DMRS.

In PUCCH formats 2/2a/2b, modulation by a CAZAC sequence is supported, and a symbol modulated according to QPSK is multiplied by a CAZAC sequence with a length of 12. The CS of the sequence is changed between symbols and between slots. OC is used for the DMRS.

Of the seven SC-FDMA symbols included in a slot, two SC-FDMA symbols spaced apart by an interval of three SC-FDMA symbols carry DMRSs and the remaining five SC-FDMA symbols carry CQI information. Two RSs are used in a slot in order to support a high-speed UE. A UE is identified using a CS sequence. CQI information symbols are modulated into SC-FDMA symbols and transmitted. An SC-FDMA symbol includes a sequence. That is, a UE modulates CQI into each sequence and transmits the sequences.

The number of symbols that can be transmitted in a TTI is 10 and QPSK is determined for modulation of CQI information. When QPSK mapping is employed for the SC-FDMA symbols, an SC-FDMA symbol may carry a 2-bit CQI value and thus a slot may carry a 10-bit CQI value. Accordingly, a maximum of a 20-bit CQI value may be carried in a subframe. To spread the CQI information in the frequency domain, a frequency domain spreading code is used.

A CAZAC sequence with a length of 12 (e.g., a ZC sequence) may be used for the frequency domain spreading code. Control channels may be distinguished from each other using CAZAC sequences having different CS values. The frequency-domain-spread CQI information is subjected to IFFT.

12 different UEs may be orthogonally multiplexed in the same PUCCH RB using 12 equally spaced CSs. For the normal CP, a DMRS sequence on SC-FDMA symbols #1 and #5 (SC-FDMA symbols #3 for the extended CP) is similar to a CQI signal sequence in the frequency domain, but the DMRS sequence is not modulated as in the case of the CQI information. A UE may be semi-statically set by higher layer signaling so as to periodically report different CQI, PMI and RI types on a PUCCH resource indicated by a PUCCH resource index $n_{PUCCH}^{(2)}$. Herein, the PUCCH resource index $N_{PUCCH}^{(2)}$ is information indicating a PUCCH region and a CS value used for PUCCH format 2/2a/2b transmission.

Hereinafter, an enhanced-PUCCH (e-PUCCH) format will be described. The e-PUCCH format may correspond to PUCCH format 3 in LTE-A. Block spreading may be applied to ACK/NACK transmission using PUCCH format 3.

Block spreading is a method of modulating a control signal using SC-FDMA, which is distinguished from the PUCCH format 1 or 2 series. As shown in FIG. 9, a symbol sequence may be spread in the time domain using an orthogonal cover code (OCC) and transmitted. Control signals of a plurality UEs may be multiplexed in the same RB using the OCC. In the case of PUCCH format 2 described above, a symbol sequence is transmitted in the time domain and control signals of multiple UEs are multiplexed using a CS of a CAZAC sequence. On the other hand, in the case of a block spreading-based PUCCH format (e.g., PUCCH format 3), a symbol sequence is transmitted in the frequency domain and control signals of multiple UEs are multiplexed through the time domain spreading based on an OCC.

FIG. 9(a) illustrates an example of generation and transmission of four SC-FDMA symbols (i.e., data portions) using an OCC with a length of 4 (or spreading factor (SF)=4) in a symbol sequence during one slot. In this case, three RS symbols (i.e., RS portions) may be used in one slot.

FIG. 9(b) illustrates an example of generation and transmission of five SC-FDMA symbols (i.e., data portions) using an OCC with a length of 5 (or SF=5) in a symbol sequence during one slot. In this case, two RS symbols may be used in one slot.

In the examples of FIG. 9, the RS symbols may be generated from a CAZAC sequence to which a specific CS value is applied, and a predetermined OCC may be applied to (or multiplied by) a plurality of RS symbols and transmitted. If 12 modulation symbols are used per OFDM symbol (or SC-FDMA symbol) and each modulation symbol is generated according to QPSK in the examples of FIG. 9, the maximum number of bits that can be transmitted in a slot is 12×2=24. Thus, the total number of bits that can be transmitted in two slots is 48. When the PUCCH channel structure employing the block spreading scheme is used, it may be possible to transmit extended control information compared to the case of existing PUCCH formats 1 and 2.

ACK/NACK Multiplexing Scheme

In ACK/NACK multiplexing, content of an ACK/NACK to a plurality of data units may be identified by a combination of an ACK/NACK unit actually used for ACK/NACK transmission and one of QPSK-modulated symbols. For example, suppose that an ACK/NACK unit carries 2-bit information and receives a maximum of two data units. Herein, it is assumed that a HARQ ACK/NACK for each of the received data units is represented by an ACK/NACK bit. In this case, a transmitter that has transmitted data may identify the ACK/NACK results as shown below in [Table 4].

TABLE 4

| HARQ-ACK(0), HARQ-ACK(1) | $n_{PUCCH}^{(1)}$ | b(0), b(1) |
|---|---|---|
| ACK, ACK | $n_{PUCCH,1}^{(1)}$ | 1, 1 |
| ACK, NACK/DTX | $n_{PUCCH,0}^{(1)}$ | 0, 1 |
| NACK/DTX, ACK | $n_{PUCCH,1}^{(1)}$ | 0, 0 |
| NACK/DTX, NACK | $n_{PUCCH,1}^{(1)}$ | 1, 0 |
| NACK, DTX | $n_{PUCCH,0}^{(1)}$ | 1, 0 |
| DTX, DTX | N/A | N/A |

In [Table 4], HARQ-ACK(i) (i=0, 1) represents an ACK/NACK result with respect to data unit i. Since a maximum of two data units (data unit 0 and data unit 1) is assumed to be received as described above, an ACK/NACK result with respect to data unit 0 is represented as HARQ-ACK(0) and an ACK/NACK result with respect to data unit 1 is represented as HARQ-ACK(1) in [Table 4]. Referring to [Table 4], DTX (Discontinuous Transmission) indicates that the data unit corresponding to HARQ-ACK(i) is not transmitted or that a receiver cannot detect presence of the data unit corresponding to HARQ-ACK(i). In addition, $n_{PUCCH,X}^{(1)}$ denotes an ACK/NACK unit actually used for ACK/NACK transmission. When there is a maximum of two ACK/NACK units, the ACK/NACK units may be represented as $n_{PUCCH,0}^{(1)}$ and $n_{PUCCH,1}^{(1)}$. In addition, b(0), b(1) denote two bits transmitted by selected ACK/NACK units. Modulation symbols transmitted through ACK/NACK units are determined depending on bits of b(0) and b(1).

For example, when the receiver successfully receives and decodes two data units (as indicated by ACK, ACK in [Table 4]), the receiver transmits two bits (1, 1) using the ACK/NACK unit $n_{PUCCH,1}^{(1)}$. If the receiver fails to decode (or detect) the first data unit (i.e., data unit 0 corresponding to HARQ-ACK(0)) of the two received data units and successfully decodes the second data unit (i.e. data unit 1 corresponding to HARQ-ACK(1)) (as indicated by NACK/DTX, ACK in [Table 4]), the receiver transmits two bits (0, 0) using the ACK/NACK unit $n_{PUCCH,1}^{(1)}$.

As such, it is possible to transmit ACK/NACK information about a plurality of data units using one ACK/NACK unit by linking or mapping a combination of a selected ACK/NACK unit and actual bits of the transmitted ACK/NACK unit (i.e., a combination of selected $n_{PUCCH,0}^{(1)}$ or $n_{PUCCH,1}^{(1)}$ and b 0), b(1) in [Table 4]) to the content of actual ACK/NACK. ACK/NACK multiplexing for more than two data units may be readily implemented by extending the principle of the above-described ACK/NACK multiplexing.

In the ACK/NACK multiplexing scheme described above, NACK and DTX may not be discriminated from each other when at least one ACK is present for each data unit (that is, NACK and DTX may be coupled as NACK/DTX as shown in [Table 4]). This is because all ACK/NACK states (i.e., ACK/NACK hypotheses) that may be generated when NACK and DTX are discriminated from each other cannot be represented by only combinations of ACK/NACK units and QPSK-modulated symbols. When ACK is not present for any data unit (i.e., when only NACK or DTX is present for all data units), a single definite case of NACK indicating that only one of HARQ-ACKs(i) is a definite NACK (i.e., NACK discriminated from DTX) may be defined. In this case, an ACK/NACK unit corresponding to a data unit for a definite NACK may be reserved for transmission of a plurality of ACK/NACK signals.

PUCCH Piggyback

In UL transmission in a legacy 3GPP LTE system (e.g., a Release-8 system), single carrier transmission with good cubic metric (CM) property or a good peak-to-average power ratio (PAPR), which affects performance of a power amplifier, is maintained to effectively utilize the power amplifier of the UE. That is, single carrier characteristics of data to be transmitted may be maintained through DFT-precoding in the case of PUSCH transmission in the legacy LTE system. In the case of PUCCH transmission, single carrier characteristics may be maintained by carrying information on a sequence having single carrier characteristics. However, if DFT-precoded data is non-continuously assigned on a frequency axis, or if PUSCH and PUCCH are simultaneously transmitted, such single carrier characteristics are not maintained.

Figure 10:
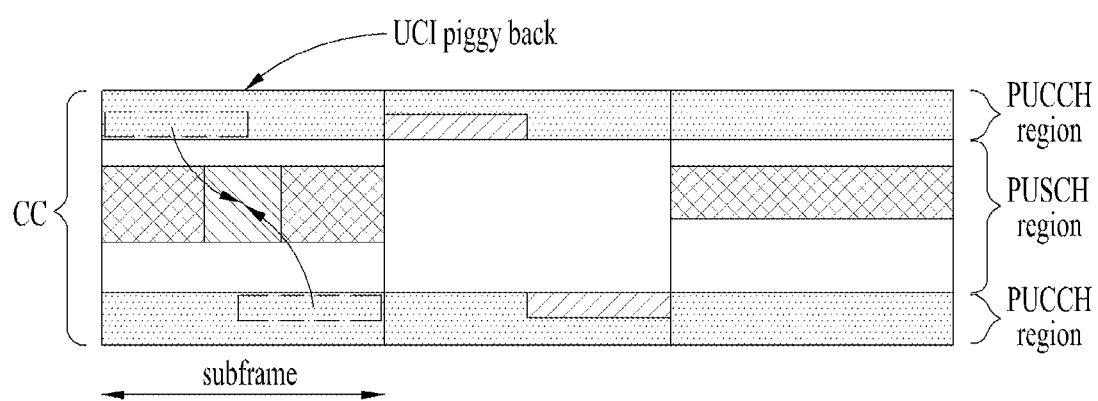
FIG. 10 illustrates a method for transmitting Uplink Control Information (UCI) on a Physical Uplink Shared Channel (PUSCH)

Thus, when PUSCH transmission takes place in the same subframe as that for PUCCH transmission as illustrated in FIG. 10, uplink control information (UCI) to be transmitted on a PUCCH may be piggybacked together with data over a PUSCH in order to maintain the single carrier characteristics.

As described before, since a legacy LTE UE cannot transmit a PUCCH and a PUSCH simultaneously, UCI (a CQI/PMI, an HARQ-ACK, an RI, etc.) is multiplexed into a PUSCH region in a subframe carrying a PUSCH. For example, if a CQI and/or a PMI is to be transmitted in a subframe allocated for PUSCH transmission, control information and data may be transmitted together by multiplexing UL-SCH data with the CQI/PMI before DFT-spreading. In this case, the UL-SCH data is rate-matched in consideration of CQI/PMI resources. The control information such as an HARQ ACK, an RI, etc. may be multiplexed into the PUSCH region by puncturing the UL-SCH data.

Enhanced-PDCCH (EPDCCH)

The EPDCCH that may be transmitted in a legacy PDSCH region is under consideration as a solution to the lack of PDCCH capacity and inter-cell interference caused by Coordinated Multi-Point (CoMP), Multi-User Multiple Input Multiple Output (MU-MIMO), etc. in an LTE system beyond Release 11. Compared to the legacy CRS-based PDCCH, the EPDCCH allows for Demodulation Reference Signal (DMRS)-based channel estimation to achieve a precoding gain.

Depending on the configuration of a Physical Resource Block (PRB) pair used for EPDCCH transmission, localized EPDCCH transmission and distributed EPDCCH transmission may be defined. The localized EPDCCH transmission means that ECCEs used for one DCI transmission are contiguous in the frequency domain, and specific precoding may be used to achieve a beamforming gain. For example, the localized EPDCCH transmission may be based on as many contiguous ECCEs as determined by an aggregation level. On the contrary, the distributed EPDCCH transmission means that one EPDCCH is transmitted in PRB pairs distributed in the frequency domain. The distributed EPDCCH transmission offers a frequency diversity gain. For example, the distributed EPDCCH transmission may be based on an ECCE having 4 EREGs included in each distributed PRB pair. One or two EPDCCH PRB sets may be configured for a UE by higher-layer signaling and each EPDCCH PRB set may be used for one of the localized EPDCCH transmission and the distributed EPDCCH transmission.

To receive/acquire DCI from an EPDCCH, the UE may perform blind decoding in a similar manner to in the legacy LTE/LTE-A system. More specifically, the UE may attempt to decode (monitor) an EPDCCH candidate set for each aggregation level, with respect to DCI formats corresponding to a configured transmission mode. The EPDCCH candidate set to be monitored may be referred to as an EPDCCH UE-specific search space and this search space may be configured/set for each aggregation level. Compared to the afore-described legacy LTE/LTE-A system, aggregation levels {1, 2, 4, 8, 16, 32} are available according to a subframe type, a CP length, and the amount of available resources in a PRB pair.

If an EPDCCH is configured for a UE, the UE indexes REs included in a PRB pair set as EREGs and indexes these EREGs on an ECCE basis. The UE determines EPDCCH candidates that form a search space based on the indexed ECCEs and performs blind decoding on the determined EPDCCH candidates, thereby receiving control information. Herein, EREG and ECCE correspond to REG and CCE of the legacy LTE/LTE-A system, respectively. One PRB pair may include 16 EREGs.

Upon receipt of an EPDCCH, the UE may transmit an ACK/NACK for the EPDCCH on a PUCCH. The indexes of resources for ACK/NACK transmission, that is, the indexes of PUCCH resources may be determined by the lowest of the indexes of ECCEs used for the EPDCCH transmission, similarly to [Equation 1], that is, according to the following [Equation 2].

$$n_{PUCCH\text{-}ECCE}^{(1)} = n_{ECCE} + N_{PUCCH}^{(1)} \quad \text{[Equation 2]}$$

In [Equation 2], $n_{PUCCH\text{-}ECCE}^{(1)}$ represents a PUCCH resource index, $n_{ECCE}$ represents the lowest of the indexes of ECCEs used for EPDCCH transmission, and $N_{PUCCH}^{(1)}$ or $N_{PUCCH,EPDCCH}^{(1)}$) represents the starting point of PUCCH resource indexes, indicated by higher-layer signaling.

However, if a PUCCH resource index is determined unconditionally by [Equation 2], resource collision may occur. For example, if two EPDCCH PRB sets are configured, ECCE indexing is independent in each EPDCCH PRB set. Therefore, the EPDCCH PRB sets may have the same lowest ECCE index. Although this problem may be solved by setting different PUCCH resource starting points for different users, setting different PUCCH resource starting points for all users amounts to reservation of a large number of PUCCH resources, which is inefficient. Further, DCI from a plurality of users may be transmitted at the same ECCE position on an EPDCCH, as is the case with MU-MIMO. To solve the problem, HARQ-ACK Resource Offset (ARO) has been introduced. The ARO enables collision between PUCCH resources to be avoided by shifting PUCCH resources, which are determined based on the lowest of the indexes of ECCEs of an EPDCCH and a PUCCH resource starting offset indicated by higher-layer signaling, by a predetermined degree. An ARO is indicated in 2 bits of DCI format 1A/1B/1D/1/2A/2/2B/2C/2D transmitted on an EPDCCH, as illustrated in [Table 5].

TABLE 5

| ACK/NACK Resource offset field in DCI format 1A/1B/1D/1/2A/2/2B/2C/2D | $\Delta_{ARO}$ |
|---|---|
| 0 | 0 |
| 1 | −1 |
| 2 | −2 |
| 3 | 2 |

An eNB may select one of the ARO values listed in [Table 5] and indicate the selected ARO value to a specific UE in a DCI format, so that the specific UE may use the ARO value in determining PUCCH resources. The UE may detect the ARO field from its DCI format and transmit a reception response in PUCCH resources determined based on the ARO value.

Transmission of Reception Response in TDD

Figure 11:
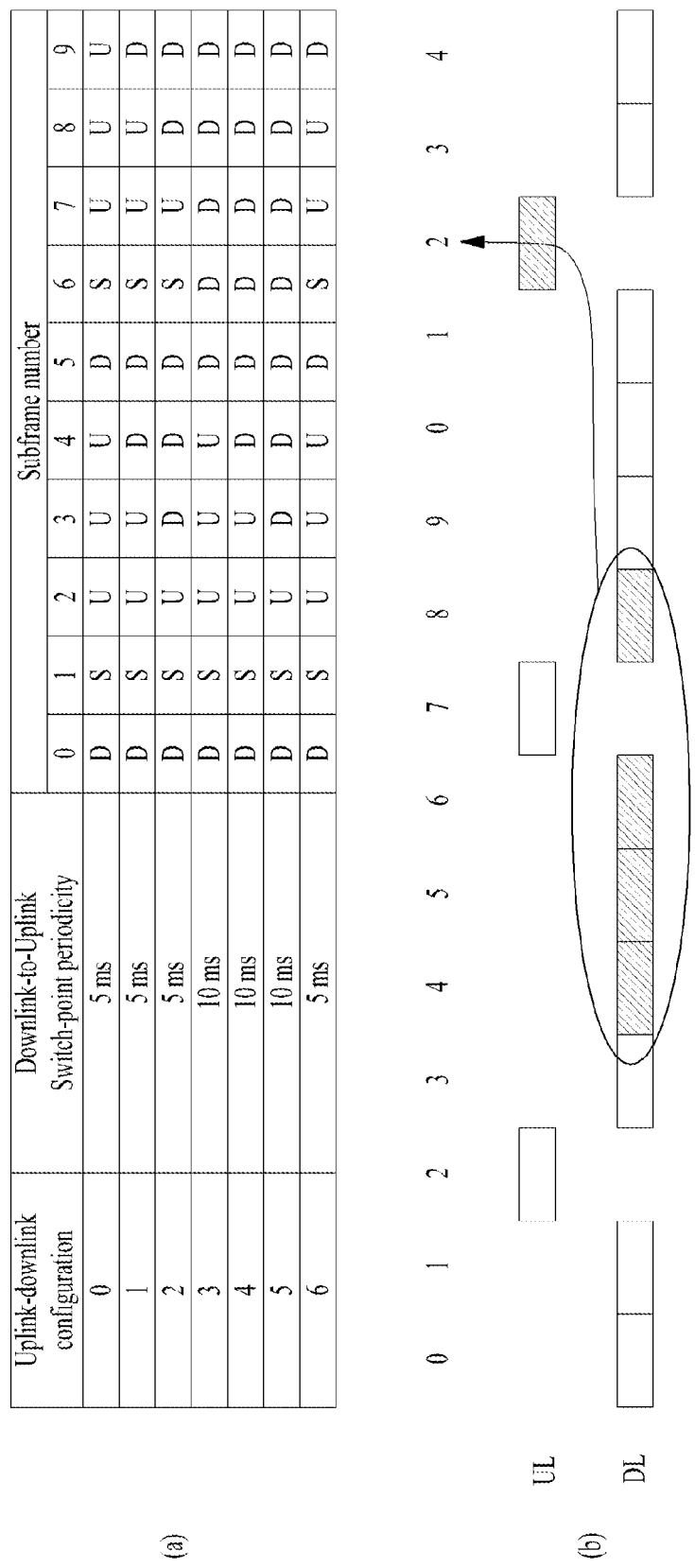

Compared to FDD, UL and DL are not distinguished by frequency in TDD. Thus, it may occur that reception responses for a plurality of (PDSCHs of) DL subframes should be transmitted in one UL subframe. This case will be described with reference to FIG. 11. FIG. 11(a) illustrates UL-DL configurations used in TDD, and FIG. 11(b) illustrates a reception response in TDD UL-DL configuration 2. Referring to FIG. 11, in the case of TDD UL-DL configuration 2, subframes available as UL subframes are limited to subframes 2 and 7. Accordingly, reception responses for eight DL subframes (including special subframes) need to be transmitted in the two UL subframes (subframes 2 and 7). For this purpose, DL association set indexes are defined as illustrated in [Table 6] below.

TABLE 6

| UL-DL config-uration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | (6) | — | [4] | — | — | [6] | — | [4] |
|   | — | — | (6) | — | [0] | — | — | [1] | — | [5] |
| 1 | — | — | (7, 6) | (4) | — | — | — | [7, 6] | [4] | — |
|   | — | — | (5, 6) | (9) | — | — | — | [0, 1] | [4] | — |
| 2 | — | — | (8, 7, 4, 6) | — | — | — | — | (8), [7, 4, 6] | — | — |
|   | — | — | (4, 5, 8, 6) | — | — | — | — | (9), [0, 3, 1] | — | — |
| 3 | — | — | (7, 6, 11) | (6, 5) | (5), [4] | — | — | — | — | — |
|   | — | — | (5, 6, 1) | (7, 8) | (9), [0] | — | — | — | — | — |
| 4 | — | — | (12, 8, 7, 11) | (6, 5, 4, 7) | — | — | — | — | — | — |
|   | — | — | (0, 4, 5, 1) | (7, 8, 9, 6) | — | — | — | — | — | — |
| 5 | — | — | 13, (12, 9, 8, 7, 5, 4, 11, 6) | — | — | — | — | — | — | — |
|   | — | — | 9, (0, 3, 4, 5, 7, 8, 1, 6) | — | — | — | — | — | — | — |
| 6 | — | — | (7) | (7) | (5) | — | — | [7] | [7] | — |
|   | — | — | (5) | (6) | (9) | — | — | [0] | [1] | — |

DL association set K includes elements {$k_0, k_1, \ldots, k_{M-1}$} in each UL subframe and M is a bundling window size, indicating the number of DL subframes for which DL association set k is supposed to carry reception responses. For each UL-DL configuration listed in [Table 6], a number written in the first row indicates how many subframes a DL subframe is earlier than a current UL subframe. For example, in UL-DL configuration 2, subframe 2 carries reception responses for $8^{th}, 7^{th}, 4^{th}$, and $6^{th}$ earlier subframes from subframe 2 (i.e., subframes 4, 5, 8, and 6 in the previous radio frame), as illustrated in FIG. 11(b). To help understanding, the second row of each UL-DL configuration indicates the index of a subframe indicated by the number written in the first row. For UL-DL configuration 2, 4, 5, 8, and 6 are written in the second row. These numbers indicate the indexes of DL subframes for which subframe 2 should carry reception responses. In [Table 6], ( ) means a subframe of a previous radio frame, [ ] means a subframe of a current radio frame, and a number without a bracket means a subframe of a second earlier radio frame from a current radio frame.

If control information is transmitted on a PDCCH, PUCCH resources for transmission of a reception response in TDD may be allocated according to [Equation 3].

$$n_{PUCCH}^{(1,p_0)} = (M-m-1) \cdot N_c + m \cdot N_{c+1} + n_{CCE,m} + N_{PUCCH}^{(1)} \quad \text{[Equation 3]}$$

In [Equation 3], $p_0$ represents an antenna port, $N_{PUCCH}^{(1)}$ represents a value indicated by higher-layer signaling, $$N_c = \max\{0, \lfloor [N_{RB}^{DL} \cdot (N_{sc}^{RB} \cdot c - 4)]/36 \rfloor\},$$

$n_{CCE,m}$ represents a first CCE used for PDCCH transmission in subframe $n-k_m$ where $k_m$ is a smallest value for detecting a PDCCH in set k, and c is a value that the UE selects from {0, 1, 2, 3} to satisfy $N_c \leq n_{CCE} < N_{c+1}$.

Figure 12:
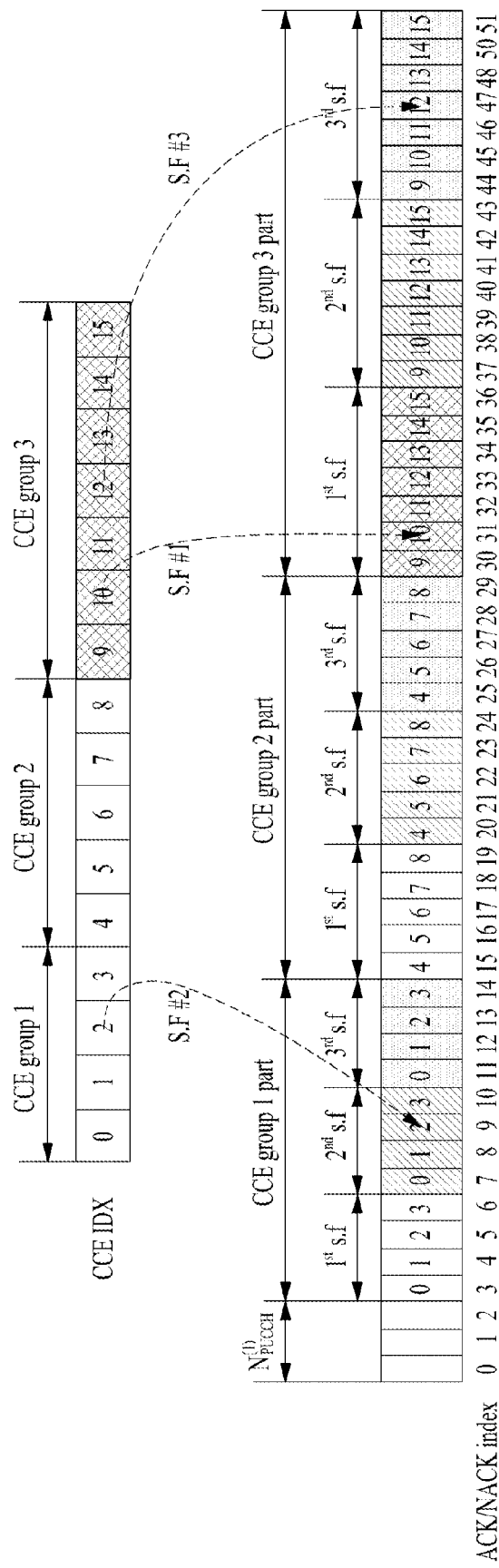

FIG. 12 illustrates an example of PUCCH resource allocation based on the above equation. In FIG. 12, it is assumed that resources are allocated for transmission of reception responses for three DL subframes ($1^{st}$ s.f., $2^{nd}$ s.f., and $3^{rd}$ s.f.) and three CCE groups (CCE groups 1, 2, and 3 each including about one OFDM symbol) exist. As illustrated in FIG. 12, to allocate PUCCH resources for each DL subframe in a UL subframe, PUCCH resources for the three DL subframes are sequentially allocated/stacked/packed from CCE group 1. Then, PUCCH resources are allocated in the same manner from CCE group 2 and CCE group 3. Therefore, different PUCCH resources are allocated for different DL subframes despite the same CCE index, thereby avoiding collision. Further, since PDCCHs having the same CCE index are not transmitted in one DL subframe to different UEs, collision does not occur.

For a TDD EPDCCH, PUCCH resources for a $j^{th}$ EPDCCH-PRB set of an $m^{th}$ subframe may be determined by [Equation 4].

$$n_{PUCCH,m,j}^{(1)} = \Delta_{ARO} + f(n_{eCCE}, p) + N_{PUCCH,j}^{(1)} + \sum_{i=0}^{m-1} N_{eCCE,i,j} \quad \text{[Equation 4]}$$

In the above equation, $\Delta_{ARO}=\{[-2], [-1], 0, 2\}$, $N_{PUCCH,j}^{(1)}$ represents a PUCCH resource offset, $$f(n_{eCCE}, p) = \begin{cases} \text{Localized:} & \lfloor n_{eCCE,j}/N \rfloor \cdot N + k_p \\ \text{Distributed:} & n_{eCCE,j} \end{cases}, n_{eCCE,j}$$

represents a first ECCE index used for EPDCCH transmission in the $j^{th}$ EPDCCH-PRB set, N represents the number of ECCEs per PRB pair, $k_p$ represents a DMRS port used for EPDCCH demodulation, and if N=1, $k_p=\{0, 1, 2, 3\}$ or if N=2, $k_p=\{0, 1\}$. According to [Equation 4], PUCCH resources are sequentially concatenated for each EPDCCH PRB set according to the sequence of an association set in order to transmit reception responses for a plurality of DL subframes in one UL subframe. For example, for EPDCCH-PRB set j in UL-DL configuration 5, a PUCCH resource region is reserved in subframe 2, for subframes corresponding to an association set {13, 12, 9, 8, 7, 5, 4, 11, 6}. FIG. 12 illustrates this example. In FIG. 12, each block represents a PUCCH resource region for each of subframes corresponding to the association set, m is the index of a DL subframe for which a reception response should be transmitted in subframe 2 (i.e., a sequential index in the association set {13, 12, 9, 8, 7, 5, 4, 11, 6}. For example, if m=1, m corresponds to 12 (a $12^{th}$ previous subframe counted from subframe 2 =subframe 0 in the previous radio frame), and $N_{eCCE,i,j}$ indicates the number of ECCEs in an $i^{th}$ subframe of EPDCCH-PRB set j.

Use of UL Subframe as DL Subframe (Enhanced Interference Management and Traffic Adaptation (eIMTA))

In TDD, each subframe (except a special subframe configured for UL-DL switching) is pre-configured as a UL subframe or a DL subframe. Referring to [Table 7] below, specifically in UL-DL configuration 0, subframes 0 and 5 are pre-configured as DL subframes and subframes 2, 3, 4, 7, 8, and 9 are pre-configured as UL subframes in one radio frame. A UL-DL configuration that a specific eNB will use may be indicated to a UE by part of system information (e.g., SIB 1). Adjacent eNBs may be forced to use the same TDD configuration, that is, the same UL-DL configuration due to interference or the like.

TABLE 7

| Uplink-downlink Configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

(D: DL subframe, U: UL subframe, and S: Special subframe)

Even though a system is operated based on the UL-DL configurations listed in [Table 7], if the amount of UL or DL data rapidly increases in each cell, one or more UL subframes may be used/switched as/to DL subframes or one or more DL subframes may be used/switched as/to UL subframes, for reliable transmission of the data, thereby increasing efficiency.

In [Table 8] below, shaded UL subframes may be switched to DL subframes. [Table 8] is for the case where a switching periodicity is allowed to be changed. If a switching periodicity is not allowed to be changed, UL subframes that may be switched to DL subframes are shaded in [Table 9].

HARQ ACK may be stably transmitted even in a system in which the usage of a subframe is dynamically changed by setting an HARQ timeline for a relative static UL subframe),

TABLE 8

| Uplink-downlink Configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

TABLE 9

| Uplink-downlink Configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Further, UL subframes may be switched to DL subframes only when a legacy TDD configuration is satisfied. In other words, if the usage of a subframe is dynamically changed, a TDD UL-DL configuration after the subframe usage change should be one of the UL-DL configurations listed in [Table 7]. For example, if subframe 4 is switched to a DL subframe in UL-DL configuration 0, subframe 9 should also be switched to a DL subframe at the same time. This case is advantageous in that it may be indicated in 1 bit whether a UL-DL configuration has been changed.

As described above, if a UL subframe is switched to a DL subframe (or vice versa) in a UL-DL configuration indicated by an SIB or the like, one of legacy TDD UL-DL configurations may be used as an HARQ timeline. That is, it may be referred to as an HARQ (reference) timeline (a DL reference HARQ timeline or a DL reference UL/DL configuration, hereinafter referred to as a DL reference HARQ timeline) in a system having a subframe whose resources are dynamically changed. The HARQ reference timeline may be a TDD configuration for an HARQ timing that is used irrespective of a dynamic resource change, or a current TDD configuration in a situation in which resources have been changed dynamically.

That is, the following timelines may be configured for a UE: i) an HARQ timeline for a UL-DL configuration indicated by an SIB, ii) a DL reference HARQ timeline as to a time when an HARQ-ACK for a PDSCH/PDCCH for SPS release received at a specific time point is to be transmitted (for CA of different TDD configurations, the DL reference HARQ timeline is defined. This is done to effectively transmit HARQ-ACKs for two CCs by setting an HARQ timeline for transmitting a common reception response for the two CCs. A similar feature may also be used for a system in which the usage of resources is dynamically changed. If the usage of a specific subframe is changed dynamically, an iii) a UL reference HARQ timeline as to when to transmit a PUSCH for a UL grant received at a specific time point and when to receive a PHICH for a PUSCH transmitted at a specific time point (for stable PHICH (PUSCH A/N) transmission and reception, the UL reference HARQ timeline may be configured for a TDD configuration having most UL subframes), and iv) an independent HARQ timeline for each DL subframe configured by separate signaling (a time delay occurs between signaling of a dynamic resource usage change by a higher-layer signal and an actual usage change. A specific SubFrame (SF) within the time delay may experience ambiguity in relation to an HARQ timeline. Such an exceptional SF is a separately indicated subframe other than the afore-described HARQ timeline, for transmission of an HARQ ACK. This operation is not likely to be indicated to every UE. If there is any UE to which the operation is not indicated, a PUCCH resource allocation scheme should be determined for the UE).

I) All UEs within a cell may follow the same SIB-based timeline, ii) UEs having a first property (e.g., UEs having no eIMTA capability or legacy UEs (hereinafter, referred to as LUEs) may follow the SIB-based timeline and UEs having a second property (e.g., UEs having an eIMTA capability or advanced UEs (hereinafter, referred to as AUEs) may follow a newly defined HARQ timeline, and iii) all UEs may follow the newly defined HARQ timeline other than the SIB-based timeline. Among the above cases, if an LUE and an AUE use different timelines, collision may occur between PUCCH resources of the LUE and the AUE.

Since PUCCH resources are pre-reserved for DL subframes for which reception responses should be transmitted in one UL subframe as described before, the use of only one timeline does not cause collision. However, if the LUE and the AUE use different HARQ timelines as in the above example, collision may occur. For example, if the LUE uses UL-DL configuration 1 as an HARQ timeline (a first timeline) and the AUE uses UL-DL configuration 2 as an HARQ timeline (a second timeline) as illustrated in [Table 10] below, the LUE and the AUE should transmit reception responses for different DL subframes in UL subframe 2 (the LUE should transmit reception responses for DL subframes 5 and 6 and the AUE should transmit reception responses for DL subframes 4, 5, 8, and 6). As a result, the LUE and the AUE use the CCE/ECCE indexes of the different DL subframes in the same PUCCH resource region, thereby causing collision between PUCCH resources.

TABLE 10

| UL-DL Config-uration | DL Subframe n | | | | | | | | | |
|---|---|---|---|---|---|---|---|---|---|---|
| | 0 | 1 | 2 | 3 | 4 | 5 | 6 | 7 | 8 | 9 |
| 1 (Legacy UE) | — | — | (7, 6) (5, 6) | (4) (9) | — — | — — | — — | [7, 6] [0, 1] | [4] [4] | — — |
| 2 (Advanced UE) | — — | — — | (8, 7, 4, 6) (4, 5, 8, 6) | — — | — — | — — | — — | (8), [7, 4, 6] (9), [0, 3, 1] | — — | — — |

In this context, methods for preventing collision between PUCCH resources will be described below.

Embodiment 1-1

If a UE receives a DL signal in subframe n in a TDD system, the UE should transmit a reception response for the DL signal in a $k^{th}$ subframe from the DL subframe. If eIMTA is applied and different timelines are configured for an LUE and an AUE, resources for reception responses in the $k^{th}$ subframe may be allocated/stacked/packed to/for a subframe common between a first timeline (a timeline for the LUE, which may be indicated by SIB 1) and a second timeline (a timeline for the AUE). In other words, the resources for reception responses in the $k^{th}$ subframe are allocated with priority to a subframe(s) of a first group, common between DL subframes for which reception responses should be transmitted in the $k^{th}$ subframe according to the first timeline and DL subframes for which reception responses should be transmitted in the $k^{th}$ subframe according to the second timeline.

Figure 15:
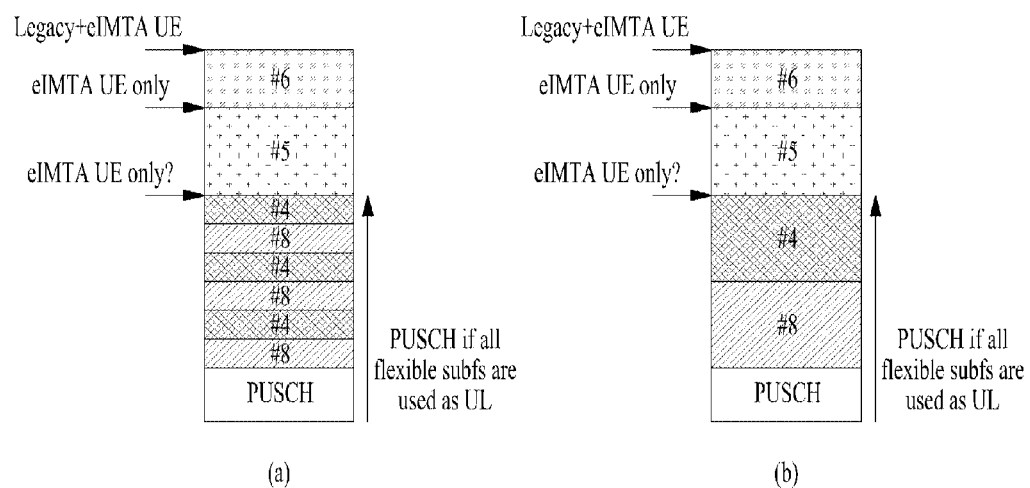

Referring to [Table 11] and [Table 15], for example, if UL-DL configuration 0 and UL-DL configuration 2 are used as the first and second timelines, respectively and reception responses are transmitted in UL subframe 2, PUCCH resources may be allocated with priority for DL subframe 6 common between DL subframe 6 for which a reception response should be transmitted in UL subframe 2 according to the first timeline and DL subframes 4, 5, 8, and 6 for which reception responses should be transmitted in UL subframe 2 according to the second timeline. Referring to FIG. 15, it is noted that PUCCH resources are allocated with priority for a common DL subframe, DL subframe 6. FIG. 15(a) illustrates a case of receiving a DL signal by a PDCCH and FIG. 15(b) illustrates a case of receiving a DL signal by an EPDCCH.

TABLE 11

| UL-DL Config-uration | Subframe n | | | | | | | | | |
|---|---|---|---|---|---|---|---|---|---|---|
| | 0 | 1 | 2 | 3 | 4 | 5 | 6 | 7 | 8 | 9 |
| 0 (first timeline) | — — | — — | (6) (6) | — — | [4] [0] | — — | — — | [6] [1] | — — | [4] [5] |
| ... | | | | | | | | | | |
| 2 (second timeline) | — — — | — — — | (8, 7, 4, 6) (4, 5, 8, 6) | — — — | — — — | — — — | — — — | (8), [7, 4, 6] (9), [0, 3, 1] | — — — | — — — |

Subsequently, at least a part of the remaining resources may be allocated to a subframe(s) of a second group, except for the common subframe(s) among the subframes for which reception responses should be transmitted in the UL subframe. The resources allocated to the subframe(s) of the second group may be contiguous to or start apart from the resources allocated to the subframe(s) of the first group by a predetermined offset. Or the resources allocated to the subframe(s) of the second group may be included in resources for a PUCCH format different from a PUCCH format carrying reception responses for the subframe(s) of the first group. For example, the resources allocated to the subframe(s) of the second group may (always) be transmitted in PUCCH format 3.

The subframe(s) of the second group may be further classified and resources may be allocated sequentially to the subframe(s) of the second group according to the properties (fixed/static or flexible) of the DL subframes. A fixed/static subframe may be one of a DL subframe and a special subframe, when the first timeline is followed. Or the fixed/static subframe may be interpreted as a subframe for which an ACK/NACK is not transmitted in a corresponding UL subframe, unlike a DL HARQ timeline of an AUE. A flexible subframe may be a subframe that is not indicated as a DL subframe or a special subframe even in the first timeline. Also, if a subframe has a larger flexibility, this means that the subframe has a larger subframe index among contiguous UL subframes. After PUCCH resources are allocated first to fixed/static subframes among the subframe(s) of the second group, the PUCCH resources may be sequentially allocated to flexible subframes. In addition, PUCCH resources may be allocated to a less flexible subframe with higher priority than a more flexible subframe among the flexible subframes. In this case, PUCCH resources for subframes having the same property and configured by a PDCCH may be interleaved on an OFDM symbol basis.

Referring to [Table 11] and [Table 15] again, for example, resources for reception responses may be allocated first to DL subframe 6 common between the first and second time lines and then to the remaining DL subframes 4, 5, and 8. Among DL subframes 4, 5, and 6, PUCCH resources may be allocated first to a fixed/static subframe, subframe 5 and then to flexible subframes, DL subframes 4 and 8. As described before, PUCCH resources for subframes configured by a PDCCH may be interleaved as illustrated in FIG. 15(a).

Embodiment 1 may be understood as indicating PUCCH resource positions by using implicit PUCCH resource mapping (CCE/ECCE indexes) for a DL subframe common to an LUE from among DL subframes of an AUE within a bundling window and allocating explicit PUCCH resources (PUCCH resources in an area indicated by a higher-layer signal: this may mean use of PUCCH format 3 or a case in which an additional PUCCH resource starting offset is\ assigned, in addition to a common PUCCH resource starting offset between the AUE and the LUE by a higher-layer signal) for a DL subframe that carries a PDCCH scheduling a PDSCH only for the AUE or a PDCCH for SPS release (i.e. a DL subframe not common to the LUE).

According to Embodiment 1, PUCCH resources may be allocated as follows. To prevent collision between PUCCH resources of the AUE and the LUE, the LUE packs PUCCH resources in a conventional manner. i) After the AUE packs PUCCH resources first for a common subframe, the AUE packs PUCCH resources by concatenating the PUCCH resources for a DL subframe monitored only by the AUE after the packing window of the LUE. ii) If a fixed DL subframe and a flexible DL subframe are coexistent among the subframes of the AUE, PUCCH resources for the flexible subframe are preferably packed after a PUCCH region for the fixed DL subframe. iii) Since a subframe having a large subframe index is flexible among flexible subframes (because in the presence of contiguous UL subframes, only an earlier UL subframe cannot be changed to a DL subframe: UUU→UUD possible and UUU→DUU impossible), the subframe having the large flexibility is relegated to a lower priority, when PUCCH resources are packed. iv) PUCCH resources for subframes having the same property (flexible or static) and configured by a PDCCH may be interleaved on an OFDM symbol basis. However, this may be limited to the PDCCH. For example, packing may be performed with priority on a PDCCH symbol basis for fixed or flexible DL subframes together from among subframes packed only by the AUE. With this rule, collision between PUCCH resources of an AUE and an LUE may be prevented and a PUCCH region may be reduced by relegating a flexible subframe to a lower priority, when the flexible subframe is not monitored. In the above description, only a part (a specific subset) may be selectively applied to the AUE. Or different rules may be applied to the PDCCH and the EPDCCH. For example, only i) may be applied to the AUE in the above description.

Embodiment 1-2

In another embodiment, use of a UL subframe as a DL subframe is indicated by a Downlink Allocation Index (DAI) and the LUE allocates PUCCH resources on the assumption that the same number of DL subframes as for the AUE are allocated. More specifically, an eNB allocates a DAI in a PDCCH/EPDCCH scheduled for the LUE based on the same TDD UL-DL configuration as for the AUE. In this case, the LUE determines the usage-changed subframe to be a missing subframe and both the LUE and the AUE use the same UL-DL configuration in allocating PUCCH resources. According to this method, both the LUE and the AUE perform an HARQ operation in the second timeline, thus partially avoiding collision between PUCCH resources. In other words, the LUE applies a channel selection table based on the second timeline in PUCCH format 1b with channel selection in this method. A shortcoming with the method is that the LUE may perform an unnecessary DTX operation, or use PUCCH format 3 or A/N bundling even though the number of DL subframes linked to one UL subframe does not actually exceed 4. For example, although both the LUE and the AUE use the same A/N table with M set to 4 in UL subframe 2 in the example of [Table 12], the LUE may not use shaded parts of [Table 13] by always processing DL subframes 4 and 8 as DTX.

TABLE 12

| UL-DL Configuration | DL Subframe n | | | | | | | | | |
|---|---|---|---|---|---|---|---|---|---|---|
| | 0 | 1 | 2 | 3 | 4 | 5 | 6 | 7 | 8 | 9 |
| Legacy UE | — | — | (7, 6) | (4) | — | — | — | [7, 6] | [4] | — |
| | — | — | (5, 6) | (9) | — | — | — | [0, 1] | [4] | — |
| Advanced UE | — | — | (8, 7, 4, 6) | — | — | — | — | (8), [7, 4, 6] | — | — |
| | — | — | (4, 5, 8, 6) | — | — | — | — | (9), [0, 3, 1] | — | — |

TABLE 13

| HARQ-ACK(0), HARQ-ACK(1), HARQ-ACK(2), HARQ-ACK(3) | $n_{PUCCH}^{(1)}$ | b(0)b(1) |
|---|---|---|
| ACK, ACK, ACK, ACK | $n_{PUCCH,1}^{(1)}$ | 1, 1 |
| ACK, ACK, ACK, NACK/DTX | $n_{PUCCH,2}^{(1)}$ | 1, 1 |
| ACK, ACK, NACK/DTX, ACK | $n_{PUCCH,0}^{(1)}$ | 1, 0 |
| ACK, ACK, NACK/DTX, NACK/DTX | $n_{PUCCH,1}^{(1)}$ | 1, 0 |
| ACK, NACK/DTX, ACK, ACK | $n_{PUCCH,3}^{(1)}$ | 1, 1 |
| ACK, NACK/DTX, ACK, NACK/DTX | $n_{PUCCH,2}^{(1)}$ | 1, 0 |
| ACK, NACK/DTX, NACK/DTX, ACK | $n_{PUCCH,0}^{(1)}$ | 0, 1 |
| ACK, NACK/DTX, NACK/DTX, NACK/DTX | $n_{PUCCH,0}^{(1)}$ | 1, 1 |
| NACK/DTX, ACK, ACK, ACK | $n_{PUCCH,1}^{(1)}$ | 0, 0 |
| NACK/DTX, ACK, ACK, NACK/DTX | $n_{PUCCH,2}^{(1)}$ | 0, 1 |
| NACK/DTX, ACK, NACK/DTX, ACK | $n_{PUCCH,3}^{(1)}$ | 1, 0 |
| NACK/DTX, ACK, NACK/DTX, NACK/DTX | $n_{PUCCH,1}^{(1)}$ | 0, 1 |
| NACK/DTX, NACK/DTX, ACK, ACK | $n_{PUCCH,3}^{(1)}$ | 0, 1 |
| NACK/DTX, NACK/DTX, ACK, NACK/DTX | $n_{PUCCH,2}^{(1)}$ | 0, 0 |
| NACK/DTX, NACK/DTX, NACK/DTX, ACK | $n_{PUCCH,3}^{(1)}$ | 0, 0 |
| NACK, NACK/DTX, NACK/DTX, NACK/DTX | $n_{PUCCH,0}^{(1)}$ | 0, 0 |
| DTX, NACK/DTX, NACK/DTX, NACK/DTX | No Transmission | |

Embodiment 1-3

In a third embodiment, different PUCCH starting offsets are assigned to the AUE and the LUE, for PUCCH resource allocation. The PUCCH starting offsets may be indicated by higher-layer signaling.

Embodiment 1-4

A fourth embodiment is about a case in which a DL subframe for which the LUE should transmit a reception response in a specific UL subframe is a subset contiguous to a DL subframe for which the AUE should transmit a reception response in the specific UL subframe. In this case, the same PUCCH starting offset may be allocated to the AUE and the LUE. Upon detection of a usage change indication for a subframe, if the number of DL subframes linked to the UL subframe corresponding to the usage change indication (i.e., the number of DL subframes for which reception response should be transmitted in the UL subframe) is different from that of the LUE, the AUE may calculate a CCE index based on the difference and apply an additional PUCCH resource stacking offset. The offset may be the number of CCEs/ECCEs included in additional DL subframes allocated to the AUE and the usage change indication indicated by the higher-layer signaling may be used as an indicator indicating the offset.

Referring to [Table 12], for example, upon detection of a usage change indication for UL subframe 3, a UE may determine a PUCCH starting position by subtracting the number of CCEs included in DL subframe 4 (when DL subframe 4 is scheduled by a PDCCH) or the number of ECCEs included in DL subframe 4 (when DL subframe 4 is scheduled by an EPDCCH) from $N_{PUCCH}^{(1)}$ (a PUCCH resource starting offset). Herein, a new PUCCH resource starting position set for the AUE may be determined by calculating $N_{PUCCH}^{(1)} - N_{CCE/ECCE} \cdot \delta(S_{SF\_Usage\_change})$ where $N_{CCE/ECCE}$ is the number of CCEs/ECCEs included in a new DL subframe allocated to the AUE, $S_{SF\_Usage\_change}$ indicates the presence or absence or a signaling indicating subframes usage change, and $\delta(x)$ is delta function that is 1 when x is 1.

Embodiment 1-4 is basically identical to Embodiment 1-3 in that PUCCH resource collision is avoided by allocating different PUCCH resources to the LUE and the AUE but is advantageous in that even though the AUE fails to detect a subframe usage change indication, PUCCH resource collision can be avoided.

Embodiment 1-5

If the AUE performs time bundling for DL subframes that are not common between the first timeline and the second timeline, PUCCH resource collision may be avoided. That is, the AUE may allocate resources for reception responses by always performing A/N time bundling and thus matching to the number of DL subframes of the LUE and using a CCE/ECCE index of a DL subframe overlapped with a DL subframe of the LUE from among the DL subframes of the AUE. A PUCCH resource index may be determined based on a DL subframe of the LUE. Time bundling may be a logical AND operation.

In the example of [Table 12], the AUE may bundle reception responses for DL subframes 4 and 8 that are not overlapped with DL subframes 5 and 6 for which reception responses should be transmitted in UL subframe 2 according to the timeline of the LUE. That is, bundling may be performed on the reception responses for DL subframes 4 and 5 and reception responses for DL subframes 6 and 8. The bundled value of DL subframes 4 and 5 may be allocated to a CCE/ECCE index position of subframe 5 and the bundled value of DL subframes 6 and 8 may be allocated to a CCE/ECCE index position of subframe 6.

Embodiment 1-6

Separate PUCCH regions may be allocated to the AUE and the LUE. PUCCH format 3 may be allocated to the LUE (or the AUE), whereas PUCCH format 1/2/1a/1b/2a/2b may be allocated to the AUE (or the LUE). Or only different starting offsets may be set for the AUE and the LUE in the same PUCCH format. In this operation, the number of DL subframes linked to one UL subframe is interpreted as different for the AUE and the LUE and a DAI of a PDCCH/EPDCCH is also indicated only for a DL subframe allocated to each of the AUE and the LUE.

Embodiment 1-7

One of Embodiment 1-1 to Embodiment 1-6 is used for a DL subframe allocated by a PDCCH and an ARO is applied in determining resources for a reception response for a PDSCH allocated by an EPDCCH. Even though different numbers of DL subframes are stacked, PUCCH resource collision may be avoided to a certain extent.

Embodiment 1-8

The AUE places resources for a reception response for a subframe allocated as a flexible subframe after the packing window of the LUE. In other words, resources are allocated first for DL subframes for which reception response should be transmitted in a UL subframe according to the first timeline of the LUE and then for DL subframes for which reception response should be transmitted in the UL subframe according to the second timeline of the AUE.

For example, referring to [Table 12] again, when the AUE allocates resources for reception responses related to DL subframes 4, 5, 8, and 6, the AUE may allocate the resources in the order of DL subframes 5, 6, 4, and 8. In this case, the same PUCCH resource starting offset may be (have been) configured for the AUE and the LUE.

Embodiment 1-9

The AUE may place resources for a reception response for a subframe allocated as a flexible subframe before the packing window of the LUE. For example, referring to [Table 12] again, the AUE may allocate resources for reception responses in the order of DL subframes 4, 8, 5, and 6, whereas the LUE may allocate resources for reception responses in the order of DL subframes 5 and 6. In this case, the AUE has a PUCCH resource starting offset before the LUE by the number of CCEs/ECCEs of DL subframes 4 and 8.

Embodiment 1-10

The AUE may pack resources for reception responses according to the timeline of the LUE, while emptying resources for reception responses for DL subframes which are indicated by the timeline of the LUE but are absent in the timeline of the AUE. Then, the AUE may place resources for reception responses for DL subframes only indicated by the timeline of the AUE after the bundling window of the LUE.

TABLE 14

| UL-DL Configuration | DL Subframe n | | | | | | | | | |
|---|---|---|---|---|---|---|---|---|---|---|
| | 0 | 1 | 2 | 3 | 4 | 5 | 6 | 7 | 8 | 9 |
| Legacy UE | — | — | (7, 6, 11) | (6, 5) | (5), [4] | — | — | — | — | — |
| Ad- | — | — | (5, 6, 1) | (7, 8) | (9), [0] | — | — | — | — | — |
| | — | — | (12, 8, | (6, 5, | — | — | — | — | — | — |

TABLE 14-continued

| UL-DL Configuration | DL Subframe n | | | | | | | | | |
|---|---|---|---|---|---|---|---|---|---|---|
| | 0 | 1 | 2 | 3 | 4 | 5 | 6 | 7 | 8 | 9 |
| vanced UE | — | — | 7, 11) (0, 4, 5, 1) | 4, 7) (7, 8, 9, 6) | — | — | — | — | — | — |

Figure 16:
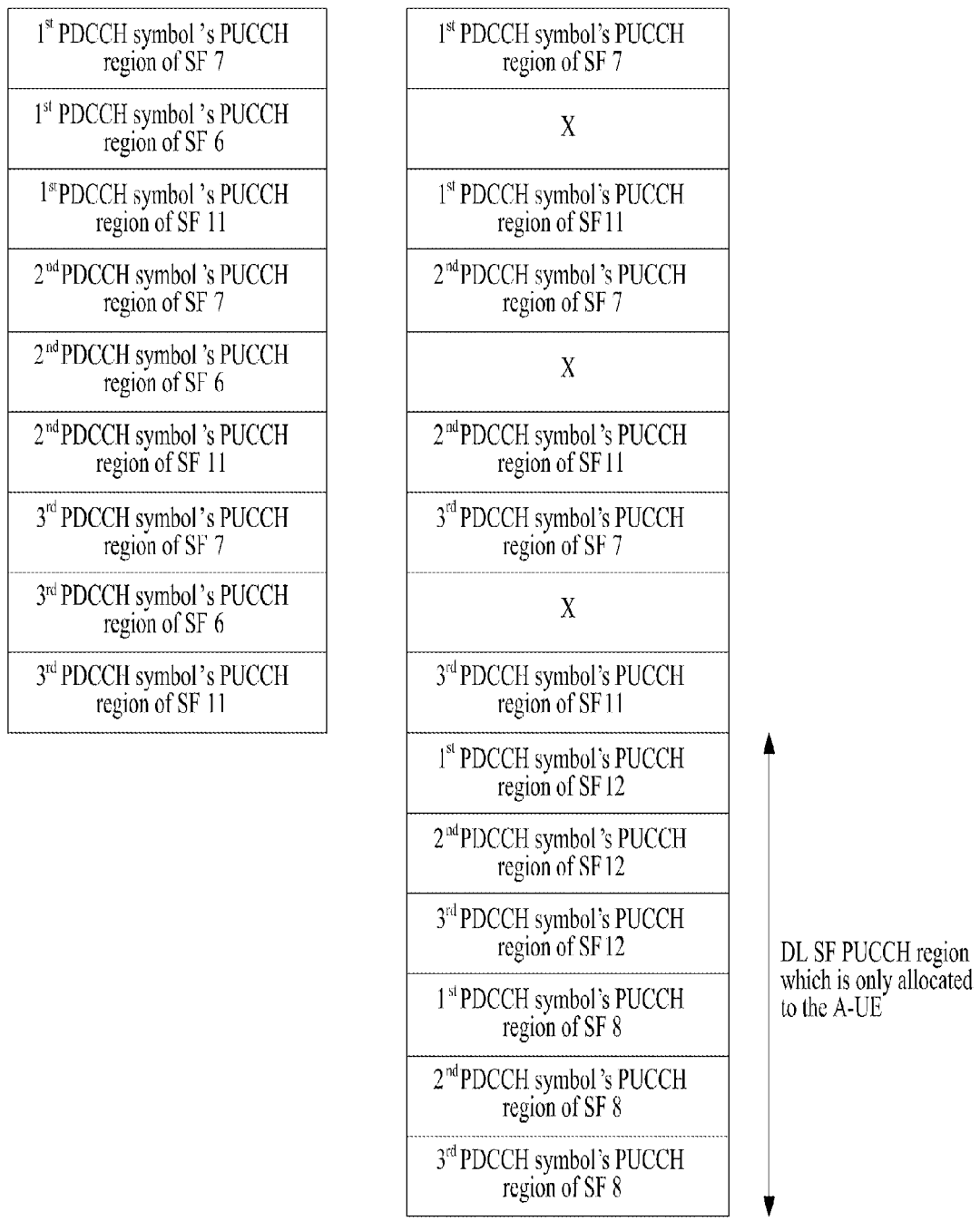

Referring to [Table 14], for example, the AUE packs resources for reception responses in the order of DL subframes 5, 6, and 1 and sets Null for DL subframe 6 absent in the timeline of the AUE. In other words, the AUE may pack resources for reception responses in UL subframe 2 in the order of {5, Null, 1, 0, 4} or {5, Null, 1, 4, 0}. Herein, Null means emptying as many resources as the number of CCEs/ECCEs of DL subframe 6. This allocation of resources for reception responses is illustrated in FIG. 16.

Embodiment 1-11

Embodiment 1-10 may bring about resource waste by setting Null. Therefore, the indexes of DL subframes may be exchanged, instead. The index exchange may be performed so that the bundling window of the AUE is as close to that of the LUE as possible. After the index exchange, the number of DL subframes may become 4 or smaller. DL subframes present only in the timeline of the AUE may be placed after (or before) the bundling window of the LUE.

For example, in [Table 14], since the AUE transmits a reception response for DL subframe 6 in UL subframe 3, the AUE may exchange (the index 7 of) DL subframe 6 for which a reception response should be transmitted in UL subframe 3 with (the index 8 of) DL subframe 4 for which a reception response should be transmitted in UL subframe 2. In this case, the AUE packs resources in the order of DL subframes {5, 6, 1, 0} in UL subframe 2 and in the order of DL subframes {7, 8, 9, 4} in UL subframe 3.

Embodiment 1-12

It is proposed that the AUE matches its packing order to the subframe packing order of the LUE. If the LUE determines a packing order by selecting one of TDD configurations indicated by an SIB, the AUE may arrange subframes in the packing order selected by the LUE and then place the remaining subframes after the arranged subframes, rather than the AUE selects a packing order sequentially from a reference TDD configuration.

The TDD UL/DL switching periodicity is 5 ms or 10 ms depending on whether the number of special subframes is 1 or 2 within 10 ms. The LUE uses one of TDD configurations with a UL/DL switching periodicity of 5 ms. If the AUE uses one of TDD configurations with a UL/DL switching periodicity of 10 ms, subframes 5, 6, 7 for the LUE are D, S, U in this order. If the AUE uses D-S-U as D-D-D, the AUE and the LUE may pack subframes in different orders because in the case of D-S-U, the LUE places a special subframe at the end of packing but the AUE determines all of the subframes to be DL subframes.

Embodiment 2-1

Now, a description will be given of embodiments related to reconfiguration of a timeline based on the foregoing description and the description of Embodiment 1-1 to Embodiment 1-12.

If the AUE receives a reconfiguration signal (e.g., a reconfiguration message, etc.), the number of packed DL subframes may become different before and after the reception of the reconfiguration signal. In this case, for a stable HARQ timeline despite the timeline reconfiguration, a DL reference HARQ timeline may be configured. For example, TDD UL-DL configuration 5 may be set as the DL reference HARQ timeline. However, PUCCH resources may be insufficient because only one UL subframe carries reception responses in UL-DL configuration 5. The DL reference HARQ timeline may be indicated to the AUE by a higher-layer signal or a physical-layer signal. A DL reference HARQ timeline and a UL reference HARQ timeline may be indicated separately. A UE may suffer from HARQ timeline ambiguity at a time point when the UE receives a reference HARQ timeline and applies it. The following embodiments may be applied to this case.

Although the AUE transmits reception responses according to the DL reference HARQ timeline, it may pack resources for the reception responses based on an actually used UL-DL configuration. If the UE is aware that it has missed a reconfiguration message, the UE may use another PUCCH format (e.g., PUCCH format 3, etc.). The UE may first pack DL subframes (or static subframes) common between DL subframes for which reception responses should be transmitted in a corresponding UL subframe according to a new timeline after reconfiguration and DL subframes for which reception responses should be transmitted in the corresponding UL subframe according to an old timeline before the reconfiguration, and then may pack resources for the remaining subframes with a lower priority. Or the UE may follow a preset UL-DL configuration (UL-DL configuration 5 or a UL-DL configuration indicated by an SIB) during an ambiguous period. Or the UE may use a set of ARO values other than an existing ARO value set used in TDD, for application to flexible subframes. Since the set of ARO values applied to the flexible subframes are configured by RRC signaling, the ARO set may be selected and used, when the UE receives a configuration change request.

Embodiment 2-2

If a UE fails to detect a reconfiguration message, the UE may monitor only static DL subframes, while processing the remaining subframes as DTX.

Figure 17:
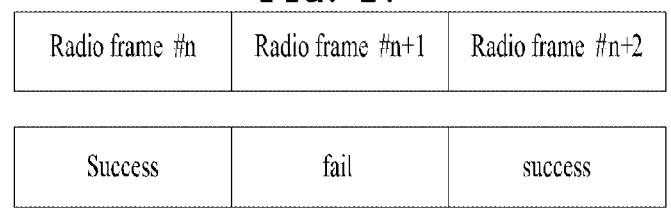

FIG. 17 illustrates an example of failure to detect a reconfiguration message. The UE may monitor only static DL subframes in radio frame #n+1. In this case, the UE may pack resources for only the monitored static DL subframes and may not pack resources for the remaining DL subframes or treat them as DTX, in radio frame #n+2.

If the UE fails to detect the reconfiguration message, the following methods for transmitting an HARQ ACK/NACK may also be used. If a reconfiguration message is delivered to a UE by DCI, the UE may determine by a CRC or the like whether it has detected the DCI successfully. If the UE fails to detect a reconfiguration message, it may perform the following operation. The UE may decode a PDSCH only in a static DL subframe and transmit a reception response for the PDSCH. Herein, the UE may follow an SIB-based timeline or a DL reference HARQ timeline. Since the UE does not monitor a PDCCH in a flexible subframe, the UE may process corresponding PDSCHs as DTX. The UE may determine DTX or non-DTX even without monitoring a flexible subframe, according to a DAI setting of an eNB.

Or if the UE fails to detect a reconfiguration message, the UE may not transmit any of reception responses (even reception responses for static DL subframes) related to a corresponding radio frame.

If static DL subframes are not packed before flexible subframes, the UE may decode PDSCHs only in subsets of static DL subframes packed before flexible subframes and transmit reception responses for the PDSCHs.

If the UE fails to detect a configuration message for "a previous radio frame", the UE may use one of the afore-described methods. In the case where the UE fails to detect a reconfiguration message for a radio frame and thus does not transmit any of reception responses related to the radio frame, if at least a part of DL subframes packed in a specific UL subframe belongs to a previous radio frame and misses a configuration message for the previous radio frame, the UE may not transmit any of reception responses in the UL subframe. This is because a packing order may be ambiguous and thus the UE drops all reception responses in the corresponding subframe.

In the foregoing embodiments, resources for a reception response to be transmitted repeatedly may be included only in a UL subframe of an available timeline having the smaller number of UL subframes between the first and second timelines. That is, if HARQ ACK repetition is triggered, a reception response repeated only in a static UL subframe is fed back. In this case, the number of repetitions may be counted only when a reception response is repeated in a static UL subframe. Also, bundling and repetition may be performed only on static DL subframes.

Soft buffer partitioning based on the number of DL HARQ processes at a UE may be performed according to a maximum number of DL HARQ processes linked to a representative UL/DL HARQ timeline. For example, if the representative UL/DL HARQ timeline is defined as UL-DL configuration 3, a UE may divide a soft buffer into as many partitions as the number of DL HARQ processes of UL-DL configuration 3, that is, 9 partitions.

Further, an eNB may set a DAI field according to a DL reference TDD configuration in the above description. If a UE packs PUCCH resources according to a current reconfiguration message, the DAI field may be based on a TDD configuration of the reconfiguration message.

In a CA environment, it may be regulated that the above descriptions are effective restrictively only when cross carrier scheduling and/or self-scheduling is used. Also, the above descriptions may be applied selectively only to UEs operating in eIMTA. Also, the above descriptions may be applied selectively only to a specific PUCCH format (e.g., PUCCH format 1a/1b/2/2a/2b).

Configurations of Apparatuses According to Embodiment of the Present Invention

Figure 18:
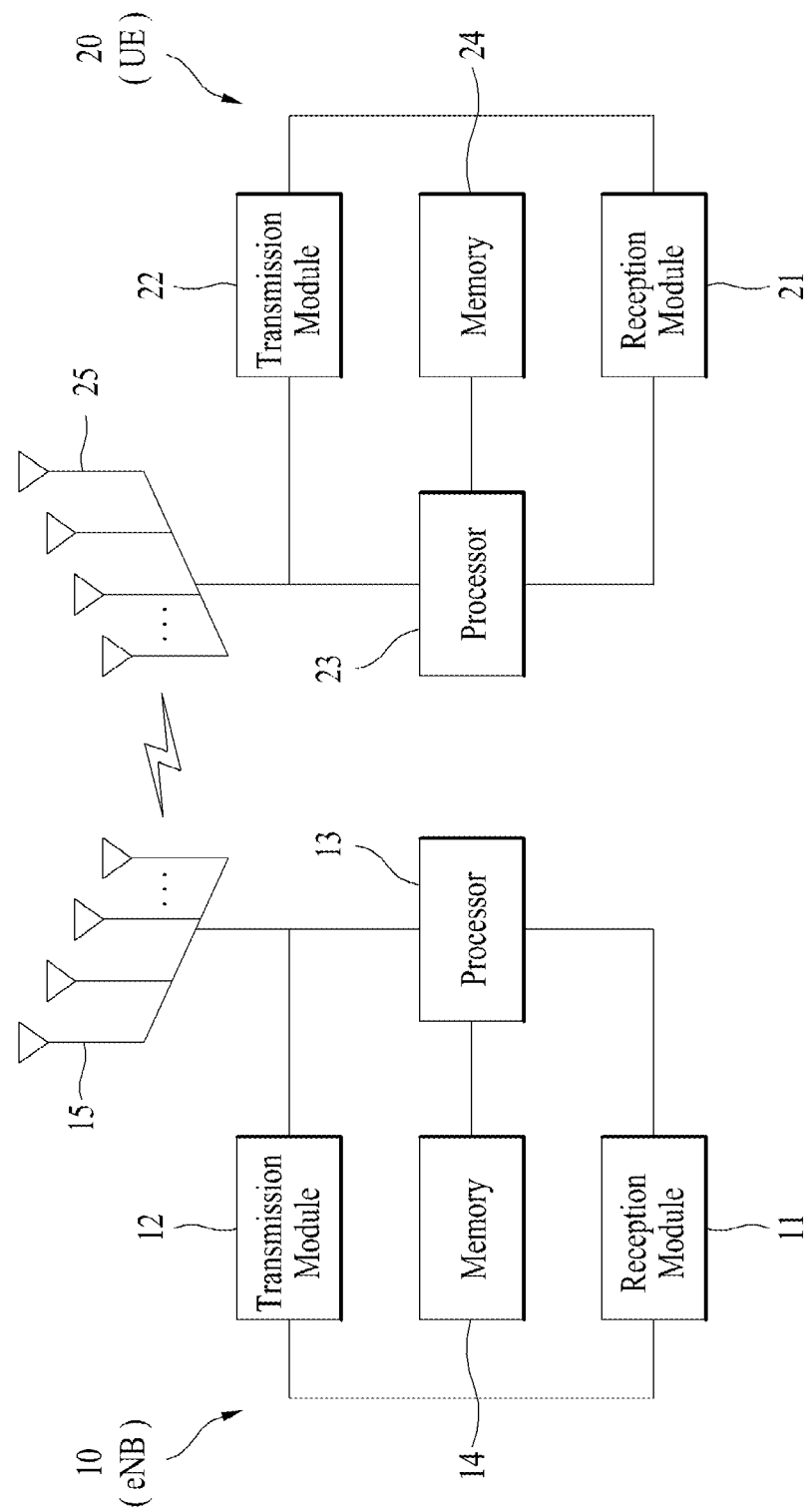
FIG. 18 is a block diagram of a transmission apparatus and a reception apparatus.

FIG. 18 is a block diagram of a transmission point and a UE according to an embodiment of the present invention.

Referring to FIG. 18, a transmission point 10 according to the present invention may include a reception module 11, a transmission module 12, a processor 13, a memory 14, and a plurality of antennas 15. Use of the plurality of antennas 15 means that the transmission point 10 supports MIMO transmission and reception. The reception module 11 may receive UL signals, data, and information from a UE. The transmission module 12 may transmit DL signals, data, and information to a UE. The processor 13 may provide overall control to the transmission point 10.

The processor 13 of the transmission point 10 according to the embodiment of the present invention may perform necessary operations in the afore-described embodiments.

Besides, the processor 13 of the transmission point 10 processes received information and information to be transmitted to the outside of the transmission point 10. The memory 14 may store the processed information for a predetermined time and may be replaced with a component such as a buffer (not shown).

Referring to FIG. 18 again, a UE 20 according to the present invention may include a reception module 21, a transmission module 22, a processor 23, a memory 24, and a plurality of antennas 25. Use of the plurality of antennas 25 means that the UE 20 supports MIMO transmission and reception using the plurality of antennas 25. The reception module 21 may receive DL signals, data, and information from an eNB. The transmission module 22 may transmit UL signals, data, and information to an eNB. The processor 23 may provide overall control to the UE 20.

The processor 23 of the UE 20 according to the embodiment of the present invention may perform necessary operations in the afore-described embodiments.

Besides, the processor 23 of the UE 20 processes received information and information to be transmitted to the outside of the UE 20. The memory 24 may store the processed information for a predetermined time and may be replaced with a component such as a buffer (not shown).

The above transmission point and UE may be configured in such a manner that the above-described various embodiments of the present invention may be implemented independently or in combination of two or more. A redundant description is omitted for clarity.

Figure 14:
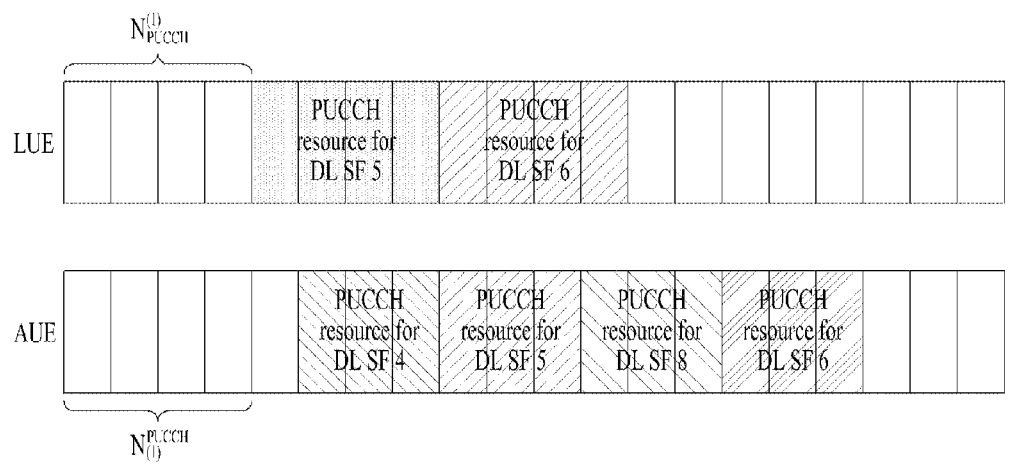
FIGS. 14 to 17 are views referred to for describing embodiments of the present invention.

The description of the transmission point 10 in FIG. 18 is applicable to a relay as a DL transmitter or a UL receiver, and the description of the UE 20 in FIG. 14 is applicable to a relay as a DL receiver or a UL transmitter.

The embodiments of the present invention may be implemented by various means, for example, in hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

The detailed description of the preferred embodiments of the present invention has been given to enable those skilled in the art to implement and practice the invention. Although the invention has been described with reference to the preferred embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present invention or included as a new claim by a subsequent amendment after the application is filed.

INDUSTRIAL APPLICABILITY

The above-described embodiments of the present invention are applicable to various mobile communication systems.

The invention claimed is:

1. A method for transmitting a plurality of uplink (UL) Hybrid Automatic Repeat Request—Acknowledgements (HARQ-ACKs) in a wireless communication system, performed by a User Equipment (UE), the method comprising:
    receiving a first uplink-downlink (UL-DL) configuration via a system information block;
    receiving a downlink (DL) signal in a plurality of subframes; and
    transmitting HARQ-ACKs in a subframe n according to the first UL-DL configuration or a second UL-DL configuration,
    wherein n is an integer greater than zero,
    wherein Physical Uplink Control Channel (PUCCH) resources for the HARQ-ACKs in the subframe n are allocated with a higher priority to DL subframes among the plurality of DL subframes for which HARQ-ACKs are to be transmitted in the subframe n according to the first UL-DL configuration than DL subframes uncommon to the first UL-DL configuration among the plurality of DL subframes for which HARQ-ACKs are to be transmitted in the subframe n according to the second UL-DL configuration, when the UE determines a PUCCH resource for the HARQ-ACKs according to the second UL-DL configuration, and
    wherein PUCCH resources for the HARQ-ACKs in the subframe n which are not allowed to be used as HARQ-ACK transmission UL subframes among the DL subframes uncommon to the first UL-DL configuration are allocated with a higher priority than PUCCH resources for the HARQ-ACKs in DL subframes which are allowed to be used as HARQ-ACK transmission UL subframes among the DL subframes uncommon to the first UL-DL configuration.

2. The method according to claim 1, wherein if the DL signal is indicated by a Physical Downlink Control Channel (PDCCH), a position of PUCCH resources for HARQ-ACK of the uncommon subframes is indicated by higher-layer signaling.

3. The method according to claim 1, wherein a DL subframe which is included in the first UL-DL configuration and absent in the second UL-DL configuration is used in determining PUCCH resources for HARQ-ACK of the DL subframes for which the HARQ-ACKs are to be transmitted in the subframe n according to the second UL-DL configuration.

4. The method according to claim 1, wherein if the DL signal is indicated by an Enhanced PDCCH (EPDCCH), PUCCH resources for HARQ-ACK of the DL subframes uncommon to the first UL-DL configuration among the DL subframes for which the HARQ-ACKs are to be transmitted in the subframe n according to the second UL-DL configuration are contiguous to PUCCH resources for HARQ-ACK of the DL subframes for which the HARQ-ACKs are to be transmitted in the subframe n according to the first UL-DL configuration.

5. The method according to claim 1, wherein the subframes related to the HARQ-ACK which is transmitted in subframe n are determined according to following table:

| UL-DL Config-uration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | —, | and
    wherein each value in the table is an available value for k.

6. The method according to claim 1, wherein the first UL-DL configuration is regardless of UL-DL usage change and the second UL-DL configuration is related to UL-DL usage change.

7. A User Equipment (UE) for transmitting a plurality of uplink (UL) Hybrid Automatic Repeat Request—Acknowledgements (HARQ-ACKs) in a wireless communication system, the UE comprising:
    a reception module; and
    a processor,
    wherein the processor is configured to:
    receive a first uplink-downlink (UL-DL) configuration via a system information block,
    receive a downlink (DL) signal in a plurality of subframes, and
    transmit an HARQ-ACKs in a subframe n according to the first UL-DL configuration or a second UL-DL configuration,
    wherein n is an integer greater than zero, and
    wherein Physical Uplink Control Channel (PUCCH) resources for the HARQ-ACKs in the subframe n are allocated with a higher priority to DL subframes among the plurality of DL subframes for which HARQ-ACKs are to be transmitted in the subframe n according to the first UL-DL configuration than DL subframes uncommon to the first UL-DL configuration among the plurality of DL subframes for which HARQ-ACKs are to be transmitted in the subframe n according to the second UL-DL configuration, when the UE determines a PUCCH resource for the HARQ-ACKs according to the second UL-DL configuration, and
    wherein PUCCH resources for the HARQ-ACKs in the subframe n which are not allowed to be used as HARQ-ACK transmission UL subframes among the DL subframes uncommon to the first UL-DL configuration are allocated with a higher priority than PUCCH resources for the HARQ-ACKs in DL subframes which are allowed to be used as HARQ-ACK transmission UL subframes among the DL subframes uncommon to the first UL-DL configuration.

8. A method for transmitting an uplink (UL) Hybrid Automatic Repeat Request—ACKnowledgement (HARQ-ACK) in a wireless communication system, performed by a User Equipment (UE), the method comprising:

receiving a first uplink-downlink (UL-DL) configuration via a system information block,
receiving a downlink (DL) signal in subframe n-k; and
transmitting HARQ-ACKs for DL signals including the DL signal in subframe n,
wherein Physical Uplink Control Channel (PUCCH) resources for the HARQ-ACKs in the subframe n are allocated with following priority order:
i) one or more common DL subframes between the first UL-DL configuration and a second UL-DL configuration,
ii) one or more DL subframes which are not allowed to be used as a UL subframe, and
iii) one or more DL subframes which are allowed to be used for UL a subframe.

9. The method according to claim 8, wherein if the DL signal is indicated by an Enhanced PDCCH (EPDCCH), PUCCH resources for HARQ-ACKs of the one or more DL subframes which are not allowed to be used as a UL subframe and the one or more DL subframes which are allowed to be used for a UL subframe are contiguous to PUCCH resources for HARQ-ACKs of the one or more common DL subframes between the first UL-DL configuration and the second UL-DL configuration.

* * * * *